(12) United States Patent
Pacella et al.

(10) Patent No.: US 10,382,552 B2
(45) Date of Patent: Aug. 13, 2019

(54) USER DEVICE AD-HOC DISTRIBUTED CACHING OF CONTENT

(71) Applicant: Verizon Patent and Licensing Inc., Arlington, VA (US)

(72) Inventors: Dante J. Pacella, Charles Town, WV (US); Mani Tadayon, Leesburg, VA (US); Ashish Sardesai, Ashburn, VA (US); Saravanan Mallesan, Fairfax, VA (US); Lee E. Sattler, Mount Airy, MD (US); Sonit Mahey, Leesburg, VA (US); Venkata Josyula, Ashburn, VA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 246 days.

(21) Appl. No.: 15/375,274

(22) Filed: Dec. 12, 2016

(65) Prior Publication Data
US 2018/0167486 A1 Jun. 14, 2018

(51) Int. Cl.
*H04L 29/08* (2006.01)

(52) U.S. Cl.
CPC ...... *H04L 67/1097* (2013.01); *H04L 67/2842* (2013.01); *H04L 67/1004* (2013.01)

(58) Field of Classification Search
CPC .................. H04L 67/282; H04L 67/1097
See application file for complete search history.

(56) References Cited

U.S. PATENT DOCUMENTS

| | | | | |
|---|---|---|---|---|
| 2003/0204602 | A1* | 10/2003 | Hudson | D01D 5/423 709/228 |
| 2009/0083279 | A1* | 3/2009 | Hasek | H04L 67/2823 |
| 2009/0319473 | A1* | 12/2009 | Rao | G06F 16/24552 |
| 2010/0299553 | A1* | 11/2010 | Cen | H04L 29/08729 714/4.1 |
| 2011/0280241 | A1* | 11/2011 | Field | H04L 12/185 370/390 |
| 2013/0097680 | A1* | 4/2013 | Bendapudi | H04L 67/2842 726/6 |
| 2013/0132967 | A1* | 5/2013 | Soundararajan | G06F 9/5066 718/104 |
| 2013/0268614 | A1* | 10/2013 | Bose | G06F 15/167 709/213 |
| 2014/0279136 | A1* | 9/2014 | Pacella | H04L 41/5029 705/26.3 |

(Continued)

*Primary Examiner* — Lashonda T Jacobs

(57) ABSTRACT

A device receives a user election of participation in a distributed cache service, and receives user selection of one or more devices, that are each associated with the user, to register with the distributed cache service as participant nodes. The device determines an amount of available storage offered to the cache service for each of the one or more participant nodes, and determines an available bandwidth of a respective network connection associated with each of the one or more participant nodes. The device admits selected devices of the one or more participant nodes into the distributed cache service based on the available storage and the available bandwidth, and interleaves storage of multiple chunks of content across a subset of the participant nodes admitted into the distributed cache service. The device enables client access to the multiple chunks of content interleaved across the subset of the participant nodes.

20 Claims, 18 Drawing Sheets

(56) References Cited

U.S. PATENT DOCUMENTS

| | | | |
|---|---|---|---|
| 2014/0280493 A1* | 9/2014 | Ortiz Rodriguez | G06F 15/167 |
| | | | 709/203 |
| 2015/0149527 A1* | 5/2015 | Forrest | H04L 67/1097 |
| | | | 709/202 |
| 2015/0248350 A1* | 9/2015 | Yoon | G06F 12/0811 |
| | | | 711/122 |
| 2015/0309942 A1* | 10/2015 | Moretti | G06F 16/00 |
| | | | 711/128 |
| 2016/0127199 A1* | 5/2016 | Ding | H04L 41/5051 |
| | | | 709/226 |
| 2016/0301751 A1* | 10/2016 | Peelen | H04L 67/104 |
| 2016/0359999 A1* | 12/2016 | Yanagihara | H04L 67/2842 |
| 2017/0366637 A1* | 12/2017 | Bandyopadhyay | |
| | | | H04L 67/2842 |

* cited by examiner

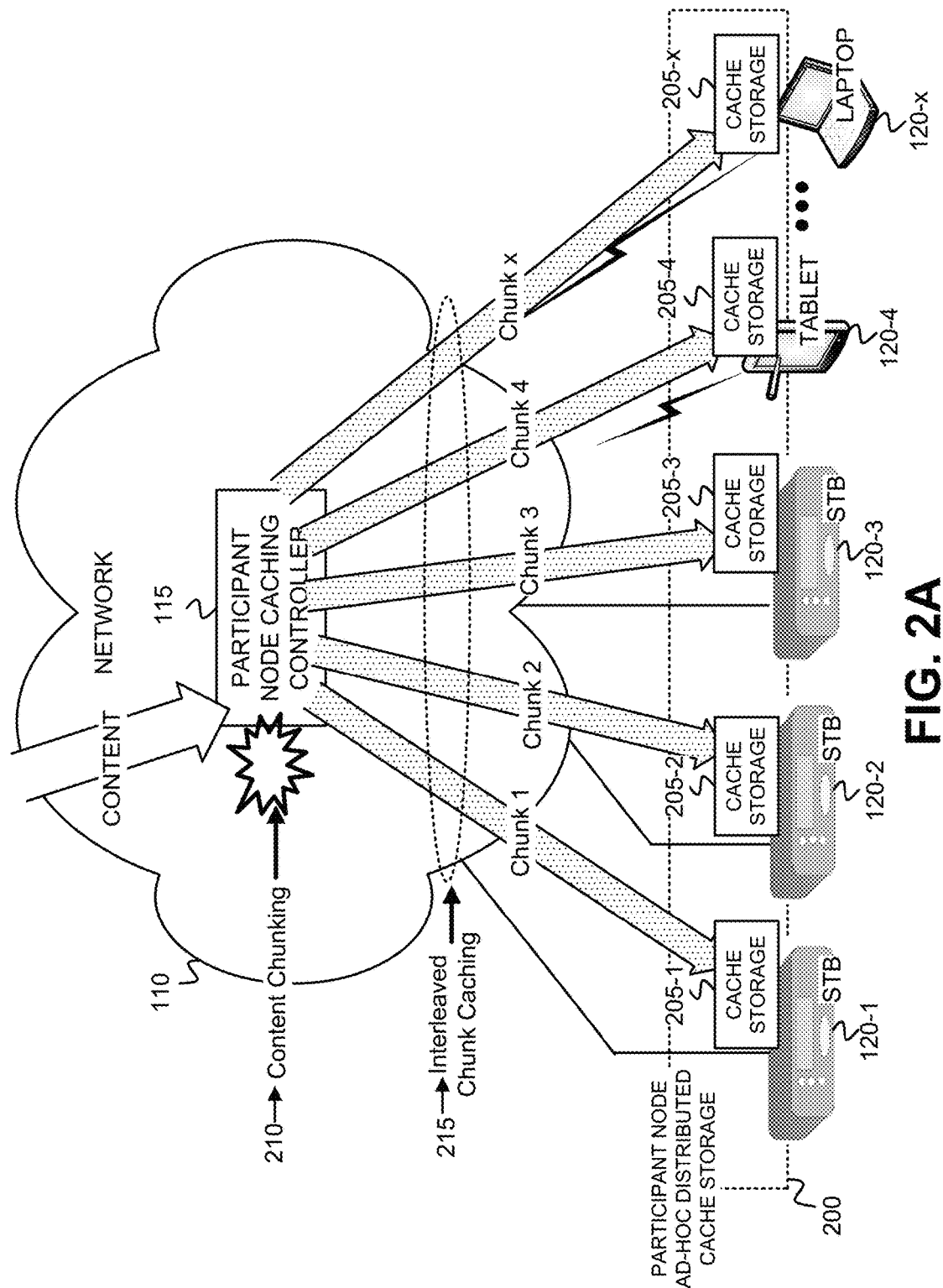

USER DEVICE AD-HOC DISTRIBUTED CACHING OF CONTENT

BACKGROUND

Content servers may deliver various types of content to endpoint client devices via a network. The content may include any type of digital content that may be sent from a content server across a network to a requesting client device. Each unit of digital content may include, for example, a segment of text, a defined set of graphics, a Uniform Resource Locator (URL), a script, a program, an application or other unit of software, a media file (e.g., a movie, television content, music, etc.), a document, or an interconnected sequence of files (e.g., Hypertext Transfer Protocol (HTTP) Live Streaming (HLS) media files).

A content delivery network (CDN) includes a large distributed system of content servers deployed in multiple data centers across the Internet. The CDN serves content, including different types of media, to end users with a high level of performance. The CDN serves, for example, web objects (text, graphics and/or scripts), downloadable objects (images, audio media, video media, software, and/or documents), applications, and live streaming media (e.g., HLS media). CDN nodes are typically deployed in multiple locations, often over multiple backbones. The benefits of a CDN include reduction of bandwidth costs, improving web page load times, and increasing the availability of content.

BRIEF DESCRIPTION OF THE DRAWINGS

FIG. 2A depicts an example of the caching of chunks of content in participant node ad-hoc distributed cache storage at multiple different participant nodes of the network environment of FIG. 1;

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

High traffic web content servers must support content requests from, and content delivery to, numerous (e.g., hundreds of thousands or even millions) different client devices. In addition to adding more server hardware, web acceleration techniques are often employed to scale to meet high volumes of this content delivery. Web acceleration includes the speeding up of the transfer of content between web servers and client devices. Caching is one technique used for web acceleration, and involves the pre-fetching and caching of content at a location that is either local to a particular client device(s), or that is "closer" to a particular client device(s). The "closer" proximity of the cache location may relate to an amount of bandwidth of connections to and from the cache location, and/or to a latency associated with delivering content from the cache location to a particular client device(s), where the latency may further relate to a network "distance" (e.g., number of hops) between the cache location and the particular client device(s). Pre-fetching includes retrieving an item of content (e.g., video content) from a web content server in advance of content requests from client devices. Caching includes identifying an appropriate cache storage location at which to store the item of content, and temporarily storing the item content at the identified cache storage. When a client device(s) requests the item of content, the item of content can be retrieved from the cache storage location and provided to the client device(s) more efficiently than if the item of content was provided from the original web content server.

Exemplary embodiments described herein implement the caching of content at devices within a "user space," where the user space includes user devices owned and/or operated by individual users. Such "user space" devices may include, but are not limited to, cellular telephones; laptop, desktop, palmtop or tablet computers; set-top boxes (STBs); wearable computer devices; media playing devices; game playing devices; digital camera devices; or personal digital assistants (PDAs). As described herein, a caching controller identifies a set of user devices, within the "user space," for serving as "cache storage" for caching content (e.g., for particular content-consuming client devices), divides each of item of content into multiple chunks of content, and interleaves the multiple chunks of content across the set of user devices for cache storage at those user devices. User devices may, thus, be used, as described herein, for the ad-hoc distributed caching of content for eventual retrieval by content consuming end-point client devices.

Figure 1:
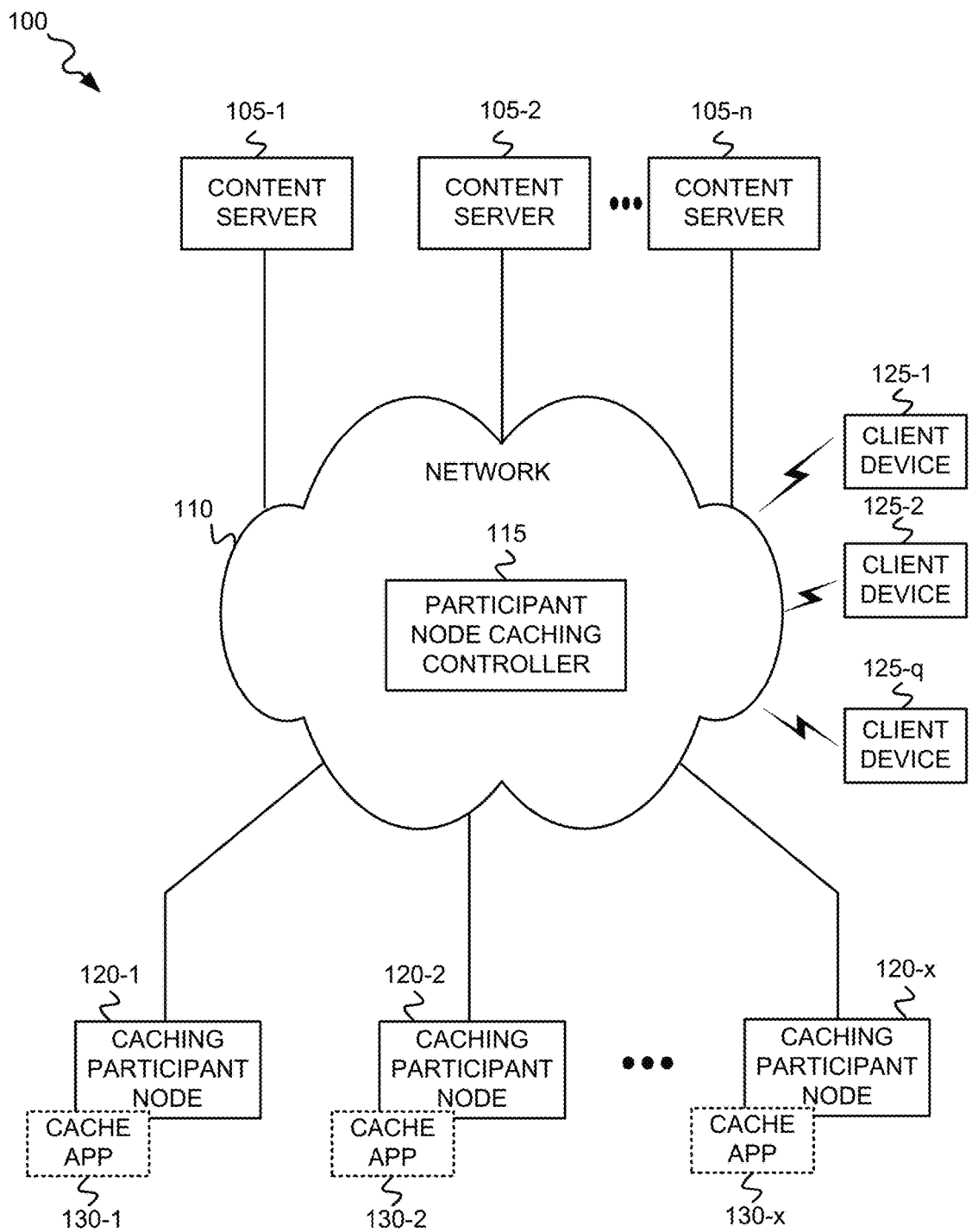
FIG. 1 depicts an exemplary network environment in which participant nodes are selectively used to cache portions of content.

FIG. 1 depicts an exemplary network environment 100 in which participant nodes (e.g., user devices) are selectively used to cache portions of content. Network environment 100 may include content servers 105-1 through 105-$n$ (generically referred to as "content server 105" or "content servers 105"), a network 110, a participant node caching controller 115 (referred to as "caching controller 115"), multiple caching participant nodes 120-1 through 120-$x$ (generically referred to as "caching participant node 120," "caching participant nodes 120," "participant node 120," or "participant nodes 120"), and multiple client devices 125-1 through 125-$q$ (generically referred to as "client devices 125" or "client device 125").

Content servers 105 may each include one or more network devices that store items of content, and deliver the items of content via network 110. The items of content may include items of audio only content (e.g., MP3, Windows Media Audio (WMA), etc.), items of video content (e.g., Audio Video Interleave (AVI) files, QuickTime files, Windows Media Video (WMV) files, MPEG-4 files, file segments for streaming media, etc.), web objects (e.g., text, graphics and/or scripts), documents, software, images, and/or other types of items of digital content.

Network 110 includes one or more networks of various types, including, for example, a wireless public land mobile network (PLMN) (e.g., a Code Division Multiple Access (CDMA) 2000 PLMN, a Global System for Mobile Communications (GSM) PLMN, a Long Term Evolution (LTE) PLMN and/or other types of PLMNs), a telecommunications network (e.g., Public Switched Telephone Networks (PSTNs)), a local area network (LAN), a wide area network (WAN), a metropolitan area network (MAN), an intranet, the Internet, or a cable network (e.g., an optical cable network). Network 110 may further include a content delivery network (CDN) that includes various network nodes for facilitating the delivery of content from content servers 105 to participant nodes 120, from participant nodes 120 to client devices 125, or from content servers 105 to client devices 125. Network 110 enables content servers 105, caching controller 115, participant nodes 120, and client devices 125 to communicate with one another, including delivering content from content servers 105 to participant nodes 120, and delivering content from participant nodes 120 to client devices 125.

Caching controller 115 includes one or more network devices that identify a set of participant nodes 120 for caching content, dividing the content into chunks, and interleaving the chunks of content across the set of participant nodes 120 for cache storage of the content. Caching controller 115, in one embodiment, may admit particular participant nodes into the ad-hoc distributed cache service based on a user election or request to participate in the cache service. Caching the content at the participant nodes 120 enables caching controller 115 to speed up the transfer of content between content servers 105 and client devices 125 when content is requested at the client devices 125. In addition to caching techniques, described herein, caching controller 115 may additionally use load balancing techniques for optimizing the flow of content between content servers 105 and participant nodes 120.

Participant nodes 120 each includes an electronic device associated with a user (e.g., a temporary or permanent owner or user of a particular user device). Participant nodes 120 may each include any type of electronic device (e.g., a digital computing device) that has a capability to communicate via a wired or wireless connection with network 110, and which also has a memory device that permits the storage of data. Participant nodes 120 may each include, for example, a cellular telephone (e.g., smart phone); a laptop, desktop, palmtop or tablet computer; a set-top box (STB); a wearable computer device (e.g., a wrist watch, glasses, etc.); a media playing device; a game playing device; a digital camera device; or a personal digital assistant (PDA). Each of participant nodes 120-1 through 120-$x$ may include a respective cache application (app) 130-1 through 130-$x$ (generically referred to as "cache app 130" or "cache apps 130"). Cache app 130 includes, for example, a software entity that further includes functionality for caching chunks of content based on interactions with, and instructions from, caching controller 115. Cache app 120 may additionally include functionality for partitioning memory storage at participant node 120 to create a first portion of memory storage available for normal usage by the participant node 120, and a second portion of memory storage reserved for usage by the cache service for caching content.

Client devices 125 each include an electronic device that "consumes" content. Client devices 125 may, for example, execute one or more applications (e.g., video or audio playing applications) that consume content provided by content servers 105. Client devices 125 may each include, for example, a cellular telephone (e.g., smart phone); a laptop, desktop, palmtop or tablet computer; a set-top box (STB); a wearable computer device (e.g., a wrist watch, glasses, etc.); a media playing device; a game playing device; a digital camera device; or a personal digital assistant (PDA). In some implementations, a particular electronic device may be both a participant node 120 that caches content, and a client device 125 that also consumes content.

The configuration of the components of network environment 100 depicted in FIG. 1 is for illustrative purposes only, and other configurations may be implemented. Therefore, network environment 100 may include additional, fewer and/or different components, that may be configured differently, than depicted in FIG. 1.

FIG. 2A depicts an example of the caching of chunks of content in participant node ad-hoc distributed cache storage 200 at multiple different participant nodes 120 (e.g., user devices) of the network environment 100 of FIG. 1. In one embodiment, the ad-hoc distributed cache storage 200 may include, at least in part, ad-hoc distributed cache storage located at multiple different participant nodes (e.g., user devices). As shown in the example, caching controller 115 may obtain an item of content (e.g., from a content server 105) and may perform content chunking 210 to divide the item of content into multiple content chunks. Caching controller 115 may then engage in interleaved chunk caching 215 to interleave the multiple content chunks across cache storages 205-1 through 205-$x$, at multiple different participant nodes 120-1 through 120-$x$, within participant node ad-hoc distributed cache storage 200. The interleaved chunk caching 215 may additionally include applying techniques for error correction and/or redundancy such that if certain chunks stored at a particular user device are corrupted, lost, or cannot be retrieved (e.g., loss of connection) at least one backup version of those chunks may be stored elsewhere, such as a backup participant node 120. In the exemplary implementation shown in FIG. 2A, participant nodes 120 may include STBs 120-1, 120-2 and 120-3, a tablet computer 120-4, and a laptop computer 120-$x$. As further shown, the content may be divided into content chunks 1 through x, and each chunk is then stored in a respective cache storage 205. For example, caching controller 115 stores chunk 1 in cache storage 205-1 at STB 120-1, stores chunk 2 in cache storage 205-2 at STB 120-2, stores chunk 3 in cache storage 205-3 at STB 120-3, etc. The participant nodes 120 selected for inclusion in participant node ad-hoc distributed cache storage 200 may be based on a number of factors, described in further detail below with respect to FIG. 9. For example, the participant nodes 120 selected for inclusion may include participant nodes 120 maintaining a certain network proximity to one or more particular content consuming client devices 125 (not shown in FIG. 2A).

Figure 2B:
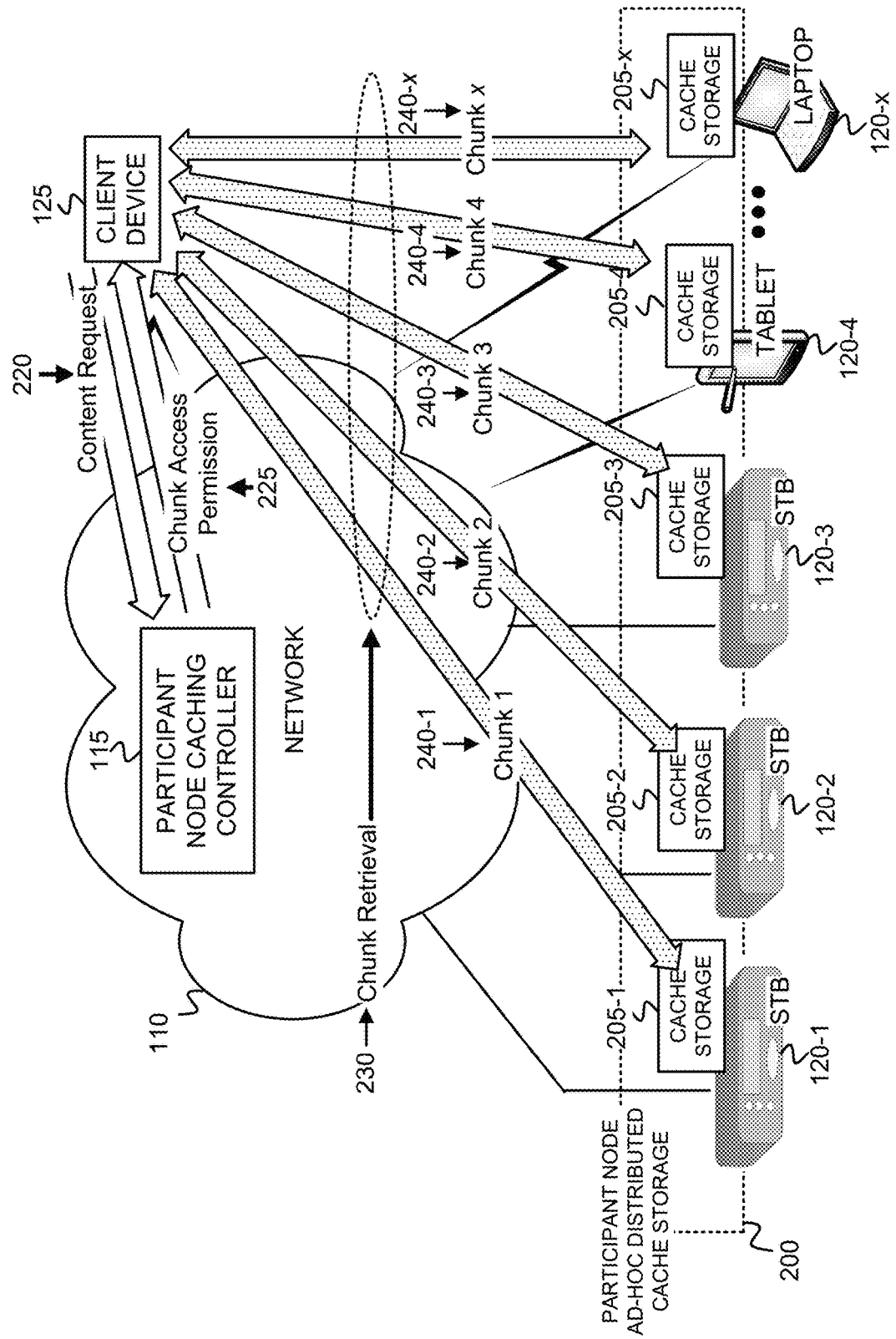
FIG. 2B depicts an example of the retrieval of chunks of content from participant node ad-hoc distributed cache storage for consumption at a client device, subsequent to the interleaved chunk caching depicted in FIG. 2A.

FIG. 2B depicts an example of the retrieval of chunks of content from participant node ad-hoc distributed cache storage 200 for consumption at a client device 125, subsequent to the interleaved chunk caching 210 depicted in FIG. 2A. As shown in the example, a client device 125 may send a content request 220, via network 110, to caching controller 115. The content request 220 may identify a particular item of content for downloading by, and consumption at, client device 125. Caching controller 115 may determine whether to grant permission to client device 125 to access the requested content. Caching controller 115 may use various techniques to determine whether to grant content access permission to client device 125, as described in further detail below. Upon determining that it is permissible to grant access to the particular client device 125 for the particular requested content, caching controller 115 returns a chunk access permission 225 to client device 125. Chunk access permission 225 may include, for example, a network address(es), a unique device ID(s), and storage locations (e.g., file paths, etc.) at which chunks of the requested content are interleaved in cache storages 205 within the participant node ad-hoc distributed cache storage 200.

Client device 125 may, based on receipt of chunk access permission 225, engage in chunk retrieval 230 to retrieve respective content chunks from each cache storage 205. For example, in the example depicted in FIG. 2B, client device 125 may retrieve chunk 1 240-1 from cache storage 205-1 of STB 120-1, chunk 2 240-2 from cache storage 205-2 of STB 120-2, chunk 3 240-3 from cache storage 205-3 of STB 120-3, chunk 4 240-4 from cache storage 205-4 of tablet 120-4, and chunk x 240-x from cache storage 205-x of laptop 120-x. Upon retrieval of the content chunks, client device 125 may order the chunks in proper sequence to produce content for consumption (e.g., for presentation to a user of client device 125). For example, if the content chunks include chunks of video content, client device 125 may order the content chunks into the original temporal sequence for playback by a media player at client device 125.

Figure 2C:
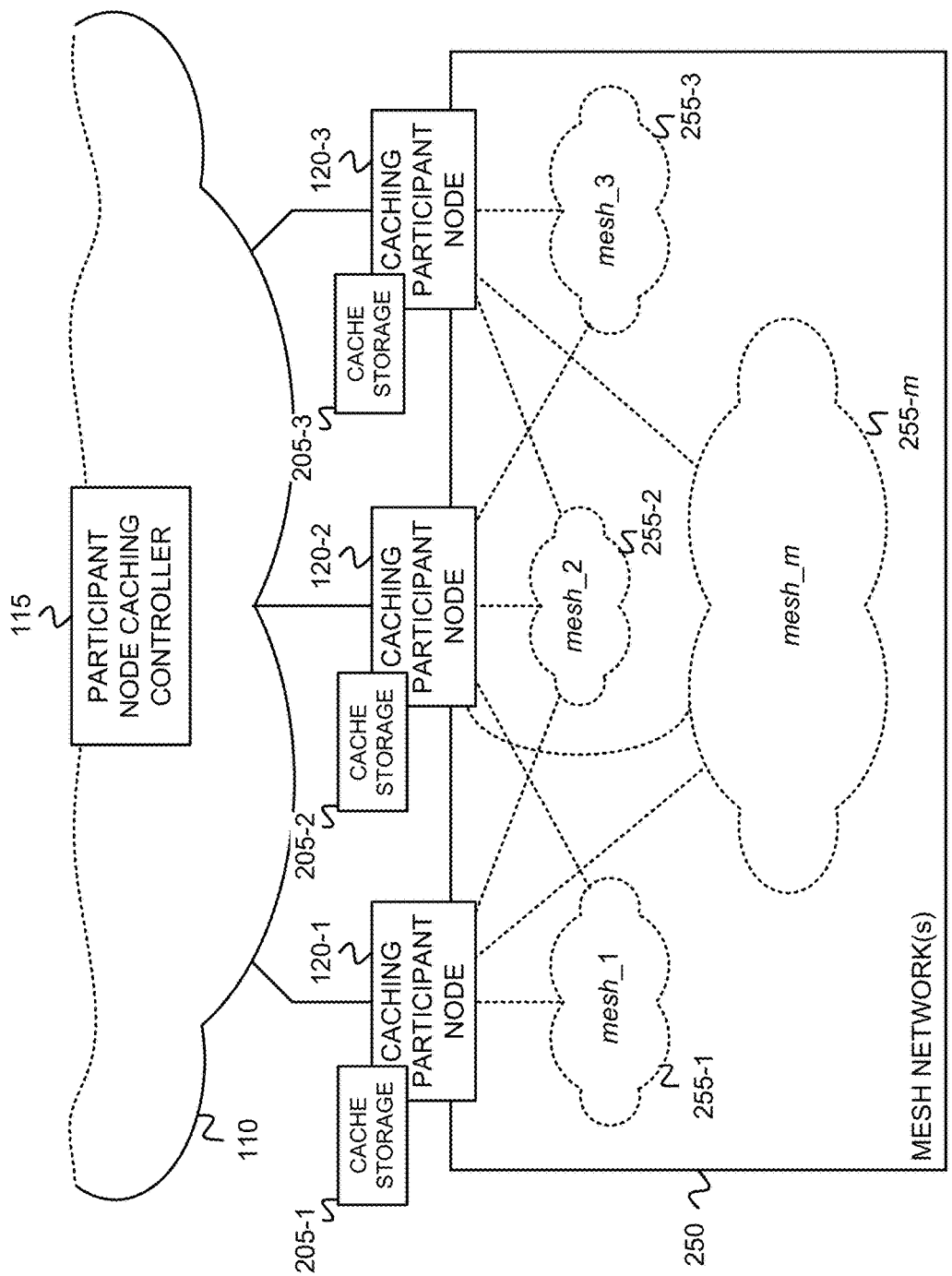
FIG. 2C depicts an example of the use of a mesh network(s) for connecting participant nodes among one another to establish dynamic paths for relaying, storing and retrieving content chunks via the mesh network(s)

FIG. 2C depicts an example of the use of a mesh network(s) 250 for connecting participant nodes 120 among one another to establish dynamic paths for relaying, storing and retrieving content chunks via the mesh network(s) 250. A "mesh network," as referred to herein, includes a network topology in which mesh nodes may relay and store data for the cache service in the network, and may otherwise cooperate in the distribution and storage of data for the cache service in the network. A "mesh network" may organically organize itself in an ad-hoc fashion, where the mesh nodes include participant nodes 120, and possibly other mesh nodes, that may be ephemeral components of the mesh network. As shown, mesh network(s) 250 may include multiple different sub-mesh networks 255-1 through 255-m (generically referred to herein as "mesh networks 255" or "mesh network 255"), where each sub-mesh network 250 connects between at least two different participant nodes 120, or between a first participant node 120 and a mesh relay node (not shown) that relays content chunks between the first participant node 120 and a second participant node 120. Each of mesh networks 225 may include, for example, a local area network (LAN) over which content chunks are relayed from a first participant node 120 to a second participant node 120. In one embodiment, each of the LANs may include a wireless LAN (WLAN), such as a Wireless Fidelity (Wi-Fi) network based on the IEEE 802.11 standards. A different service set identifier (SSID) may be attached to the header of packets sent over a particular WLAN, where the SSID uniquely names a WLAN and enables a connection to the basic service set (BSS) of the WLAN. The SSID differentiates one WLAN from another, so participant nodes 120 attempting to connect to a particular WLAN mesh network 255 must use a same SSID in their packet headers. As shown in the example mesh network topology of FIG. 2C, participant node 120-1 connects to mesh network 255-1, 255-2, and 255-m. Participant node 120-2 connects to mesh network 255-1, 255-2, 255-3 and 255-m. Participant node 120-3 connects to mesh network 255-2, 255-3, and 255-m.

Figure 2D:
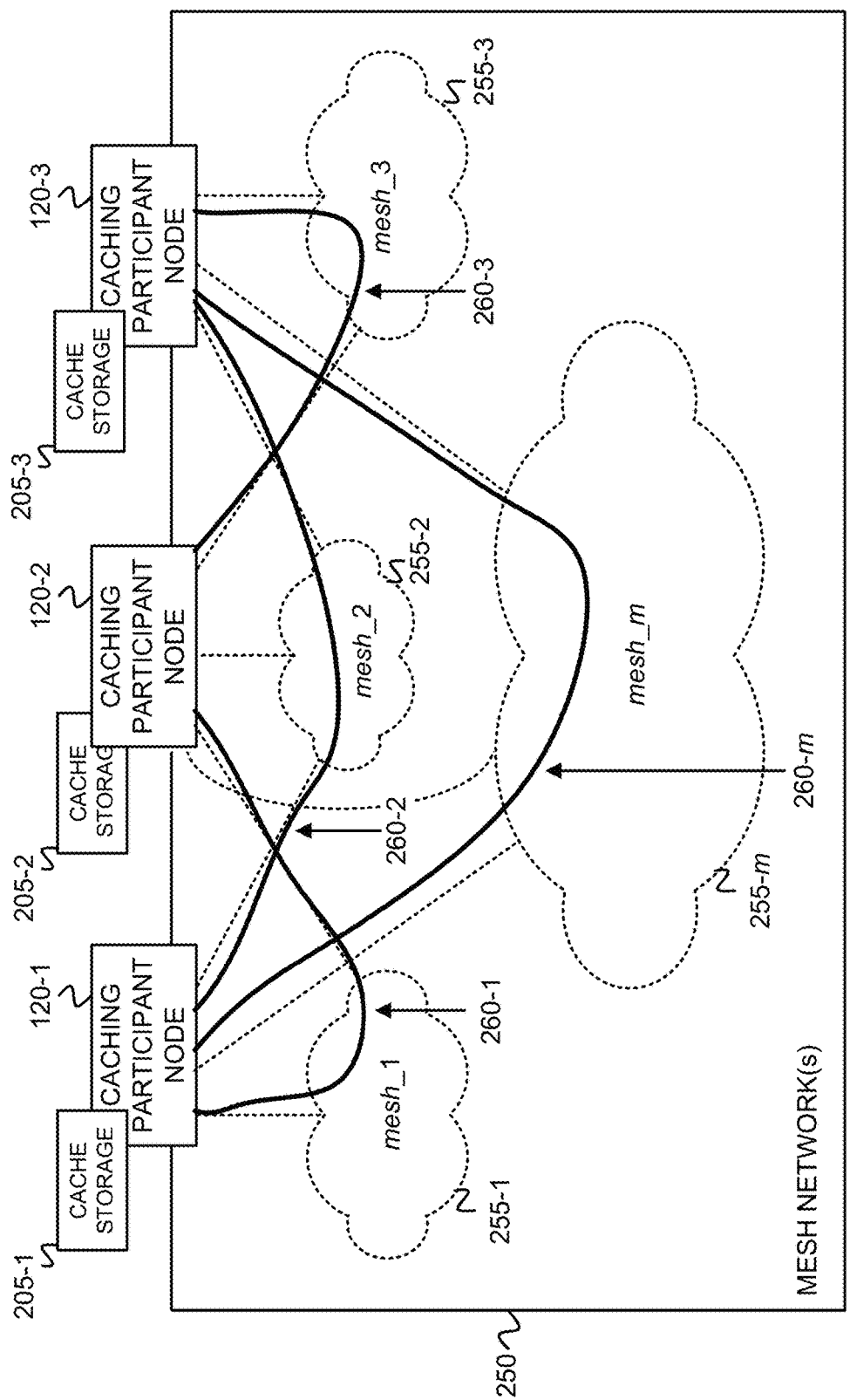
FIG. 2D depicts examples of dynamic paths for storing and/or retrieving content chunks via mesh networks, and/or for relaying content chunks between participant nodes via the mesh networks.

FIG. 2D depicts examples of dynamic paths for storing and/or retrieving content chunks via mesh networks 255, and/or for relaying content chunks between participant nodes 120 via the mesh networks 255. As shown in FIG. 2D, participant node 120-1 may use a path 260-1, via mesh network 255-1, for storing content chunks at participant node 120-2, for retrieving content chunks from participant node 120-2, and for relaying content chunks, received from another participant node (not shown) to participant node 120-2. As further shown, participant node 120-3 may use a path 260-2, via mesh network 255-2, for storing content chunks at participant node 120-1, for retrieving content chunks from participant node 120-1, and for relaying content chunks, received from another participant node (not shown) to participant node 120-1. FIG. 2D also depicts that participant node 120-2 may use a path 260-3, via mesh network 255-3, for storing content chunks at participant node 120-3, for retrieving content chunks from participant node 120-3, and for relaying content chunks, received from another participant node (not shown) to participant node 120-3. FIG. 2D additionally depicts that participant node 120-1 may use a path 260-m, via mesh network 255-m, for storing content chunks at participant node 120-3, for retrieving content chunks from participant node 120-3, and for relaying content chunks, received from another participant node (not shown) to participant node 120-3. Paths 260-1, 260-2, 260-3 and 260-m may also be used to store, retrieve and/or relay content chunks in an opposite direction to that described above. Though point-to-point (P2P) paths are depicted in FIG. 2D, point-to-multipoint (PMP) paths may additionally, or alternatively, be used for storing and retrieving content chunks.

Figure 2E:
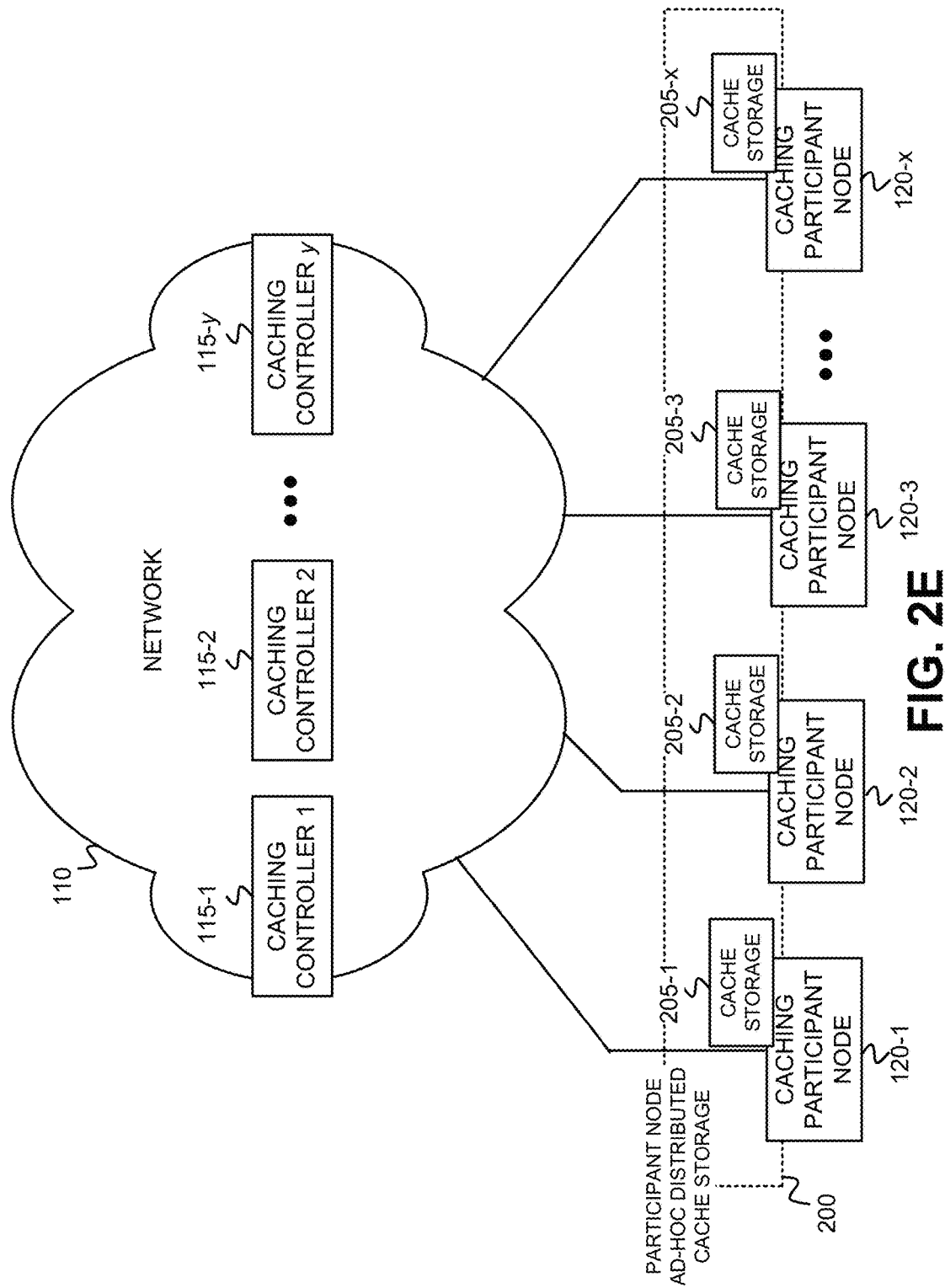
FIG. 2E depicts an exemplary embodiment in which multiple different caching controllers may be used to control the caching of content chunks in the ad-hoc distributed cache storage.

FIG. 2E depicts an exemplary embodiment in which multiple different caching controllers 115-1 through 115-y may be used to control the caching of content chunks in ad-hoc distributed cache storage 200. In this embodiment, particular participant nodes 120 of participant nodes 120-1 through 120-x may be assigned to certain ones of caching controllers 115-1 through 115-y. The assignment of participant nodes 120 to caching controllers 115 may, for example, be negotiated among the caching controllers 115 based on criteria such as proximity, mesh network communication range, current loading on each of the caching controllers 115, and/or stability (e.g., bandwidth, connectivity, etc.)

associated with each of the caching controllers 115. Other criteria not described herein may, however, be used by caching controllers 115 for negotiating the assignment of participant nodes 120. The proximity criteria may be a geographic proximity where the geographic distance between each caching controller and each participant node 120 is used as a basis for assignment, or may be a network hop proximity where the number of hops across network 110, between each caching controller 115 and each participant node 120, is used as a basis for assignment. If participant nodes 120 are associated with different CDNs or with different data centers, then the different CDNs, or different data centers, along with their associated participant nodes 120, may be assigned to particular caching controllers 115 based on, for example, negotiation among the caching controllers 115.

Figure 3:
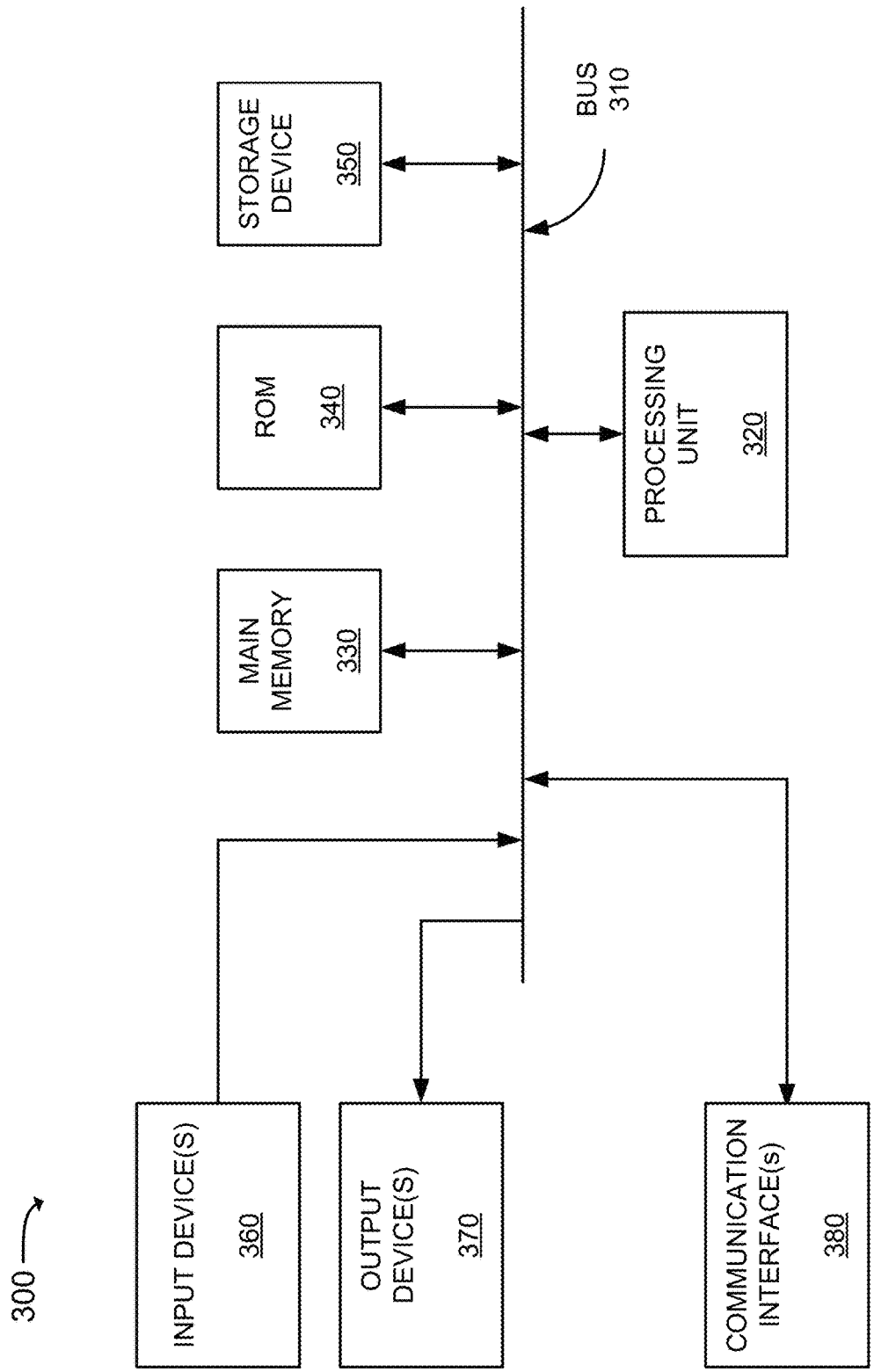
FIG. 3 is a diagram that depicts exemplary components of a device that may correspond to the content servers, the caching controller, the participant nodes, and the client devices depicted in FIG. 1, 2A or 2B.

FIG. 3 is a diagram that depicts exemplary components of a device 300. Content servers 105, caching controller 115, participant nodes 120, and client devices 120 may each be configured the same as, or similar to, device 300 shown in FIG. 3. Device 300 may include a bus 310, a processing unit 320, a main memory 330, a read only memory (ROM) 340, a storage device 350, an input device(s) 360, an output device(s) 370, and a communication interface(s) 380. Bus 310 may include a path that permits communication among the components of device 100. Bus 310 may include, for example, a wired electrical, optical, or wireless path among the components of device 100.

Processing unit 320 may include one or more processors or microprocessors, or processing logic (i.e., hardware), which may execute instructions. Main memory 330 may include a random access memory (RAM) or another type of dynamic storage device that may store information and instructions for execution by processing unit 320. ROM 340 may include a ROM device or another type of static storage device that may store static information and instructions for use by processing unit 320. Storage device 350 may include a magnetic, flash memory, and/or optical recording medium. Main memory 330, ROM 340 and storage device 350 may each be referred to herein as a "tangible and/or non-transitory computer-readable medium."

Input device 360 may include one or more mechanisms that permit an operator to input information to device 300, such as, for example, a keypad or a keyboard, a display with a touch sensitive panel, voice recognition and/or biometric mechanisms, etc. Output device 370 may include one or more mechanisms that output information to the operator, including a display, a speaker, etc. Input device 360 and output device 370 may, in some implementations, be implemented as a user interface (UI) that displays UI information and which receives user input via the UI. Communication interface(s) 380 may include one or more transceivers that enable device 300 to communicate with other devices and/or systems. For example, communication interface(s) 380 may include one or more wired or wireless transceivers for communicating via network 110.

The configuration of components of device 300 shown in FIG. 3 is for illustrative purposes. Other configurations may be implemented. Therefore, device 300 may include additional, fewer and/or different components, arranged in a different configuration, than depicted in FIG. 3.

Figure 4:
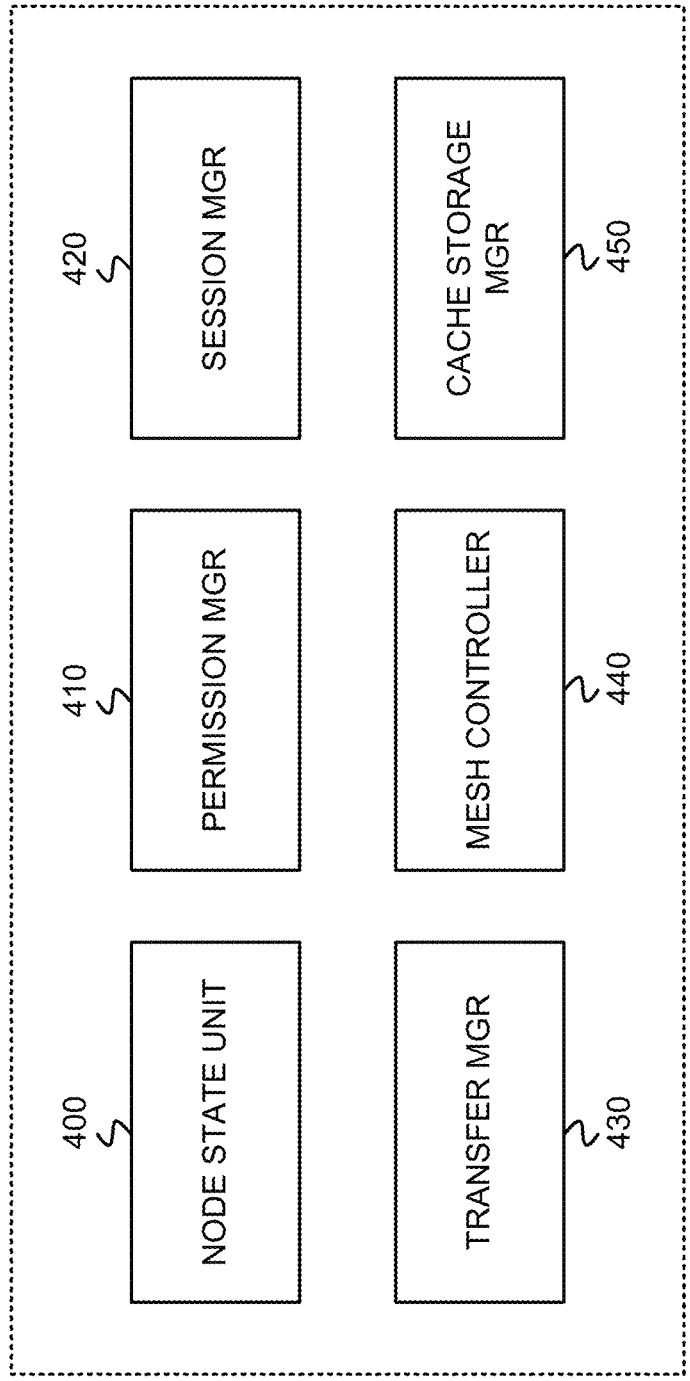
FIG. 4 is a diagram that depicts exemplary functional components of the caching controller of FIG. 1.

FIG. 4 is a diagram that depicts exemplary functional components of caching controller 115. The functional components depicted in FIG. 4 may be implemented in software or hardware, or in a combination of software and hardware. For example, if implemented in software, then the functionality of each of the components depicted in FIG. 4 may be implemented as instructions stored in main memory 330, ROM 340, and/or storage device 350 for execution by processing unit 320 of FIG. 3. Caching controller 115 may include a node state unit 400, a permission manager 410, a session manager 420, a transfer manager 430, a mesh controller 440, and a cache storage manager 450. The various functional components 400-450 of caching controller 115 may, in one embodiment, be implemented in a single network device. In other embodiments, the various functional components 400-450 of caching controller 115 may be implemented in a distributed fashion (e.g., in a cloud) across a system of network devices that includes multiple different network devices. For example, in the system of network devices a first network device of caching controller 115 may implement node state unit 400, a second network device of caching controller 115 may implement mesh controller 440, a third network device of caching controller 115 may implement cache storage manager 450, etc.

Node state unit 400 determines a state of participant nodes 120 for purposes of the participant node ad-hoc distributed caching service. Node state unit 400 may, for example, perform the "health checks" of the exemplary process of FIGS. 8A and 8B. Node state unit 400 may, for example, determine an amount of available storage at each participant node 120 registered with the cache service, and may determine the available bandwidth of one or more network connections associated with each participant node 120 registered with the cache service. Node state unit 400 may, for example, also determine the stability and/or volatility of each participant node 120, registered with the cache service, with respect to each participant node 120's continuous availability for use by the cache service.

Permission manager 410 grants, or denies, access permission to client devices 125 for obtaining access to content stored in participant node ad-hoc distributed cache storage 200. Permission manager 410 may also include functionality for granting permission to content servers 105 to store content in cache storage 205.

Session Manager 420 manages sessions related to requesting or accessing content by client devices 125. Transfer manager 430 controls the transfer of data from content servers 105 to participant node ad-hoc distributed cache storage 200, and from participant node ad-hoc distributed cache storage 200 to client devices 125. Mesh Controller 440 keeps track of one or more mesh networks formed between particular participant nodes 120, and one or more other network nodes, where the particular participant nodes 120 may act as relays for relaying content chunks for storage in cache storage at an endpoint network node (e.g., another participant node 120 only connected to the particular participant node 120). For example, participant node 120-1 may connect via a wireless local area network (LAN) (e.g., a Wi-Fi network) to another participant node 120-2, where participant node 120-2 has no other connection to network 110. In this example, participant node 120-2 may act as a relay for relaying content chunks to, and from, cache storage 205 at the other participant node 120-2 connected to the same wireless LAN.

Cache storage manager 450 controls the storage of content, received from content servers 105, in participant node ad-hoc distributed cache storage 200. Cache storage manager 450 may also divide received content in chunks, for encrypting the chunks of content, and for interleaving the encrypted chunks across multiple different cache storages 205 of participant nodes 120. Cache storage manager 450 may interact with mesh controller 440 when storing content chunks at a participant node 120 accessible via a mesh network.

The configuration of functional components of caching controller 115 shown in FIG. 4 is for illustrative purposes. Other configurations may be implemented. Therefore, caching controller 115 may include additional, fewer and/or different functional components, than depicted in FIG. 4.

Figure 5:
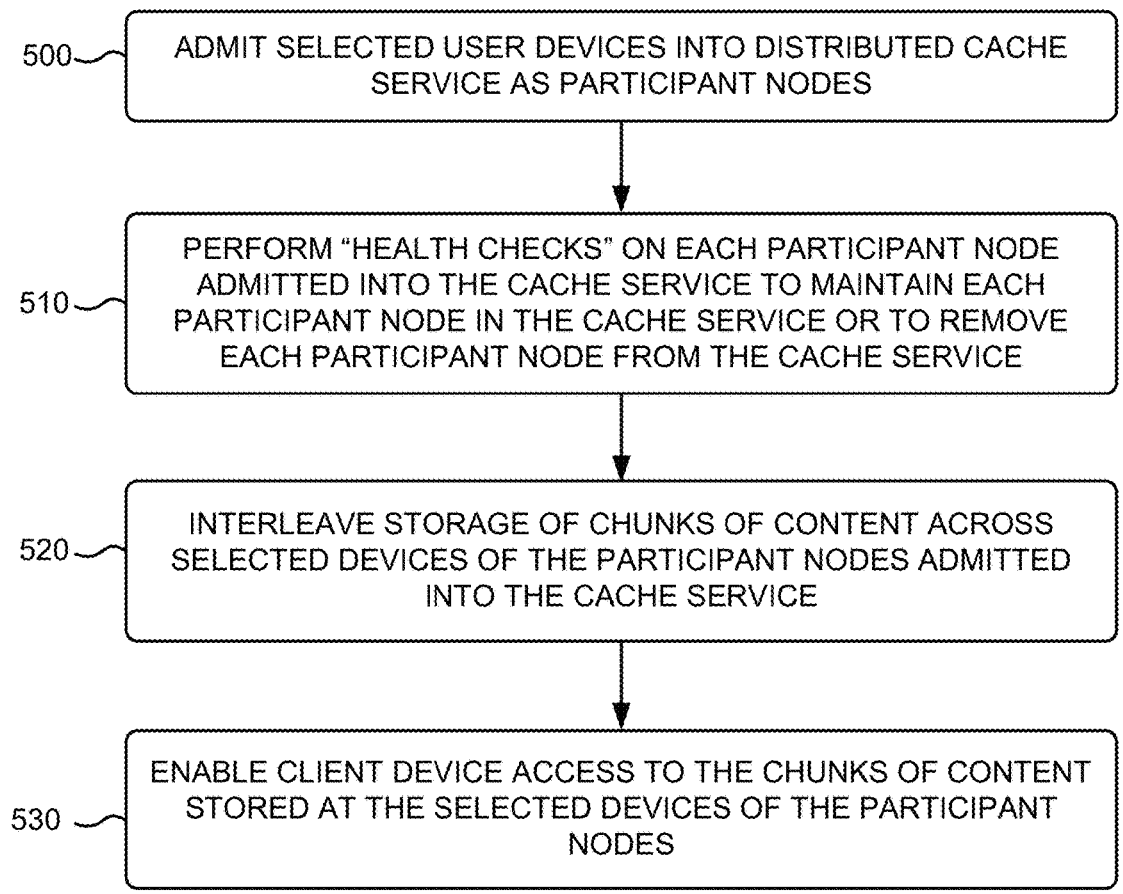
FIG. 5 is a flow diagram that illustrates an exemplary overall process for implementing a participant node ad-hoc distributed cache service.

FIG. 5 is a flow diagram that illustrates an exemplary overall process for implementing a participant node ad-hoc distributed cache service. The exemplary process of FIG. 5 may be implemented by caching controller 115, possibly in conjunction with other nodes.

The exemplary process includes caching controller 115 admitting selected user devices into the participant node ad-hoc distributed cache service as participant nodes (block 500). A set of user devices, to be used in the distributed ad-hoc cache service as participant nodes, may be created based on, for example, user election of participation in the cache service, and user selection of particular ones of the user's devices to register with the cache service. The set of user devices may further be created based on a determined amount of available storage, offered to the cache service, for each user device, based on a determined available bandwidth of a respective network connection associated with each user device, and/or based on a determined stability or volatility of each registered participant node as being available to the cache service. Details of block 500 of FIG. 5 (i.e., the admission of selected user devices into the distributed ad-hoc cache service as participant nodes), according to one exemplary embodiment, is described below with respect to the process of FIGS. 6A and 6B. Caching controller 115 may also, once selected user devices have been admitted into the cache service as participant nodes, permit the user devices to be removed from participation in the cache service. For example, the user of the participant node 120 may change their mind about their devices' participation in the cache service, and may notify caching controller 115 that their devices have been removed from participation in the cache service.

Caching controller 115 may perform "health checks" on each participant node 120 (e.g., user device) admitted in the cache service to maintain each participant node 120 in the cache service or to remove each participant node 120 from the cache service (block 510). The "health checks" may include, for example, determining a current amount of available storage at each participant node, determining a current bandwidth of a network connection(s) to each participant node, and/or determining a stability and/or volatility of each participant node with respect to being available to the cache service upon demand. Details of block 510 of FIG. 5 (i.e., the performance of "health checks" on each user device admitted into the cache service), according to one exemplary embodiment, is described below with respect to FIGS. 8A and 8B.

Caching controller 115 may interleave storage of chunks of content across selected devices of the participant nodes admitted into the cache service (block 520). Caching controller 115 may identify content for caching, divide the content into chunks, encrypt the divided chunks, and send the encrypted chunks to selected devices of the set of participant nodes admitted into the cache service for interleaving across cache storage 205 at the selected devices. Details of the interleaving of chunks of content across cache storage of different participant nodes, according to one embodiment, is described below with respect to FIG. 9.

Caching controller 115 enables client device access to the chunks of content stored at the selected devices of the participant nodes (block 530). In response to a content request from a client device 125, caching controller 115 may authenticate the client device 125, and may grant or deny content access to the requesting client device 125 based on the authentication. If content access is granted, caching controller 115 returns a chunk access permission message to the requesting client device 125 that includes, among other data, unique device IDs and/or network addresses associated with the participant nodes at which the content chunks are interleaved. The message may further include chunks names associated with each cached content chunk, a decryption key for decrypting the content chunks, and the storage locations of the content chunks in cache storage 205 at the participant nodes 120. Details of the requesting of content, the provision of chunk access permission, and client retrieval of content chunks from cache storage 205 at participant nodes 120, according to one embodiment, is described below with respect to FIG. 11.

Blocks 500, 510, 520 and 530 may be continuously, or periodically, repeated in the sequence shown in FIG. 5. Alternatively, one or more of blocks 500, 510, 520 and/or 530 may be executed in parallel with other of the blocks. For example, block 510 may be executed independently, and in parallel with, execution of the other blocks of FIG. 5.

Figure 6A:
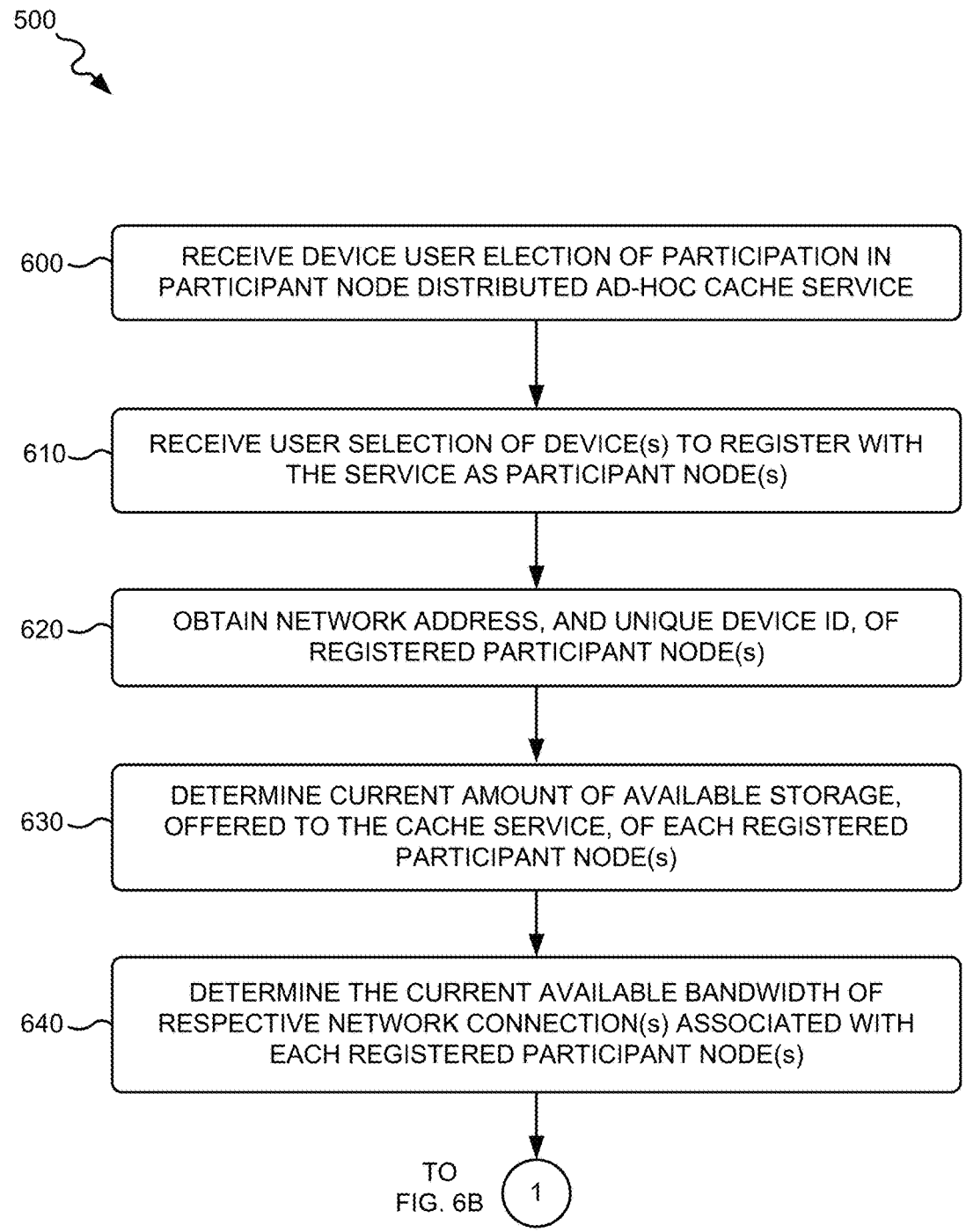
FIGS. 6A and 6B are flow diagrams that illustrate an exemplary process for admitting selected participant nodes (e.g., user devices) into the ad-hoc distributed cache service.
Figure 6B:
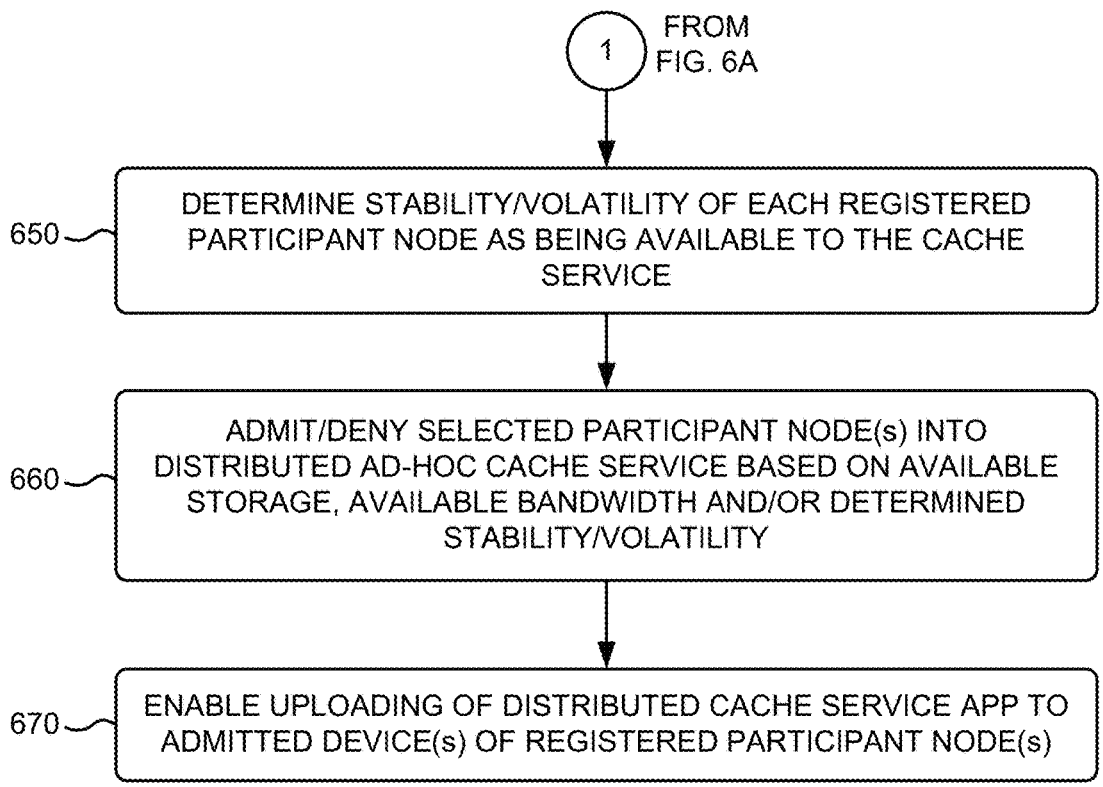

FIGS. 6A and 6B are flow diagrams that illustrate an exemplary process for admitting selected participant nodes into the ad-hoc distributed cache service. The exemplary process of FIGS. 6A and 6B may be implemented by caching controller 115, possibly in conjunction with other nodes. The exemplary process of FIGS. 6A and 6B represents one exemplary implementation of block 500 of FIG. 5, and is described below with reference to the example of FIG. 7.

The exemplary process includes caching controller 115 receiving a device user's election of participation in the participant node distributed ad-hoc cache service (block 600). A user (e.g., owner, operator and/or administrator) of a participant node 120 (e.g., a user device) may, via a user interface of the participant node or via the user interface of another node/device, provide information to caching controller 115 that indicates that the user elects to participate in the ad-hoc distributed cache service. In one embodiment, the user may be a subscriber to content from a particular content server 105, and participation in the ad-hoc distributed cache service may earn the user a discount on the user's subscription rate to the content from that content server 105. Caching controller 115 receives user selection of the user's device(s) 120 to register with the cache service as participant nodes (block 610). As a follow-up to electing to participate in the cache service, the user may elect one or more devices, from a group of devices owned, used and/or operated by the user. For example, the group of the user's devices may include one or more STBs residing at the user's home location, a cellular telephone, a smart phone, and/or a tablet computer owned by the user, and a desktop computer owned by the user, and the user may elect one or more devices from this group to participate in the cache service.

Caching controller 115 obtains a network address, and a unique device identifier (ID), of the registered participant node(s) (block 620). The user of the registered participant node(s) may manually supply the network address and/or the unique device ID of the registered participant node(s). Alternatively, caching controller 115 may obtain the network address and/or the unique device ID from a node in network 110 that maintains a record of such information. For example, a server associated with a service provider that provides network service to the registered user device(s) may keep track of the network address(es) and/or unique device ID(s) of the registered user device(s), and caching controller 115 may obtain the network address(es) and/or the unique device ID(s) from the server. Caching controller 115 may additionally, or as an alternative to the network address, obtain a network location at which the registered participant node 120 attaches to network 110. For example, if the registered participant node 120 attaches to a local area network (LAN), which in turn connects to network 110 via a server, router, or gateway, then caching controller 115 may obtain the network location (e.g., the network address) of the network attachment via the server, router, or gateway.

Caching controller 115 determines a current amount of available storage, offered to the cache service, of each registered participant node(s) (block 630). In addition to receiving a user registration for particular devices/nodes, caching controller 115 may receive an indication from the user of how much storage of the participant nodes is being offered to the cache service by the user. Caching controller 115 may further receive an indication of how much of the storage of the devices/nodes, offered by the user, is currently available for use by the cache service. The storage offered to the cache service by the user may be selected by the user per device for each of the participant nodes, or may be selected globally for an entire group of participant nodes. For example, a user may have two devices being registered with the cache service, with device 1 having 100 Gigabytes (GB) of free storage space and device 2 having 10 GB of free storage space. The user may offer 10 GB of device 1, and 1 GB of device 2, for use by the cache service for caching content chunks. The user may offer any desired portion of available free storage space (i.e., any percentage) at a user device for use by the cache service. Using the network address(es) or unique device ID(s) obtained in block 620, caching controller 115 may query each registered participant node to determine how much total free storage space is currently unused by the participant node(s).

Caching controller 115 determines the current available bandwidth of a respective network connection(s) associated with each registered participant node(s) (block 640). Caching controller 115 may determine, for example, an overall upload speed (i.e., bandwidth) for sending data for storage at each registered participant node, and an overall download speed (i.e., bandwidth) for retrieving data from storage at each registered participant node. The determined overall upload and download speeds provides an indication to caching controller 115 of the available bandwidth(s) of one or more network connections between caching controller 115 and the participant node(s).

Caching controller 115 determines a stability and/or volatility of each registered participant node as being available to the ad-hoc distributed cache service (block 650). Caching controller 115 may make a determination in regards to any issue that affects the stability and/or volatility of each participant node 120 being available for use by the cache service. The determined stability and/or volatility of each participant node 120 being available to the cache service may be, for example, based on an amount of time that each participant node 120 is turned on, power instability issues associated with each participant node (e.g., frequent power outages), the user of each participant node 120 frequently dropping, and re-joining the cache service, or frequent and significant reductions in bandwidth available for connecting to each participant node 120. The determined stability of each participant node 120 being available to the cache service may further be based on predictive modeling that predicts a future availability of a participant node 120 based on a prior history of availability of the participant node 120, such as when the prior history indicates a pattern of availability or non-availability of participant node 120. For example, a prior history may indicate that a "user device 1" (e.g., a STB) associated with a user is turned off every night from 11 pm to 6 am; a "user device 2" (e.g., tablet computer) associated with the user is only turned on Friday-Sunday each week or every holiday, during work hours, or school hours; and a "user device 3" (e.g., a smart phone) associated with the user leaves a certain geographic area during Monday-Friday work hours or enters a certain geographic area during weekend periods. Based on this prior history, predictions may be made regarding the availability of these user devices to the cache service during various days of the week, during particular days of a month, and/or during particular hours of each day. For example, a "calendar of availability" may be constructed for each participant node, based on a prior history that indicates a pattern (e.g., daily/hourly) of availability or non-availability to the cache service.

In one embodiment, the determined stability and/or volatility of each participant node 120 being available to the cache service may be formalized as an admission "score" or "ranking" that can be used as a mechanism to determine whether to admit (or deny) a participant node 120 into the cache service. Various algorithms may be used to generate the admission score or ranking based on, for example, the "calendar of availability" for each participant node 120 and/or based on other factors described above with respect to block 650.

Caching controller 115 admits/denies selected participant node(s) into the ad-hoc distributed cache service based on the current available storage, the current available bandwidth and/or the determined stability/volatility of node availability (block 660) as determined in blocks 630, 640 and 650. Caching controller 115 may analyze the amount of available storage, offered to the cache service, determined in block 630 for each participant node 120, the available bandwidth of a network connection(s) to each participant node 120 determined in block 640, and/or the stability or volatility of each participant node as being available to the cache service as determined in block 650, and then admit or deny the registered participant node(s) 120 into the ad-hoc distributed cache service. The participant node(s) 120 selected for admission into the cache service may be added to a set of participant nodes 120 available for use in the cache service.

Figure 7:
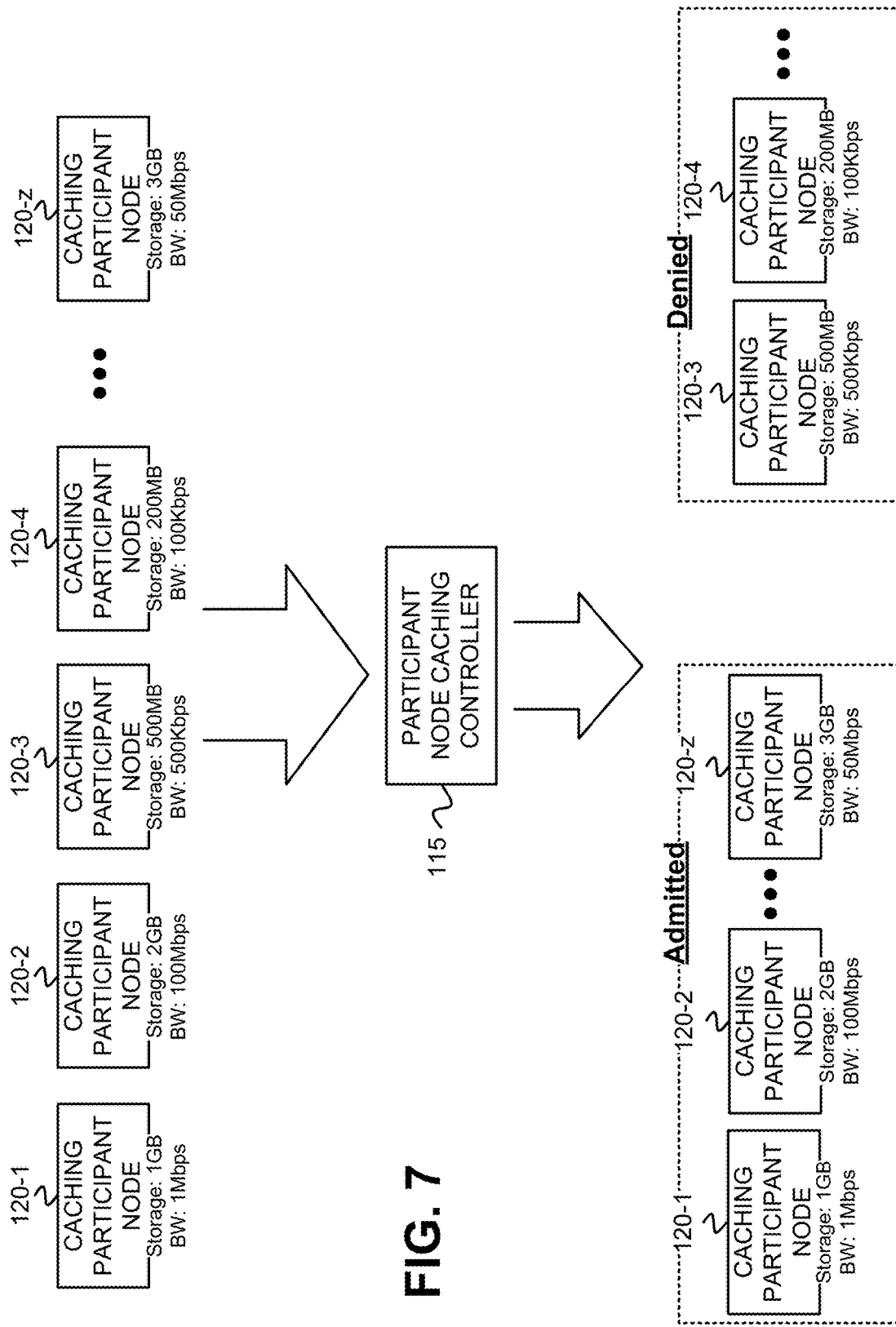
FIG. 7 depicts one example of the admission of participant nodes into the ad-hoc distributed cache service.

FIG. 7 depicts one example of the admission/denial of participant nodes 120-1 through 120-x into the ad-hoc distributed cache service. As shown in FIG. 7, a group of nodes/devices 120-1 through 120-z may be selected by a particular user for participation in the cache service. As further shown in FIG. 7, participant node 120-1 may be determined to have an available storage offered to the cache service of 1 GB, and a determined available bandwidth of 1 Megabits per second (Mbps); participant node 120-2 may be determined to have an available storage offered to the cache service of 2 GB, and a determined available bandwidth of 100 Mbps; participant node 120-3 may be determined to have an available storage offered to the cache service of 500 Megabytes (MB), and a determined available bandwidth of 500 Kilobits per second (Kbps); participant node 120-4 may be determined to have an available storage offered to the cache service of 200 MB, and a determined available bandwidth of 100 Kbps; and participant node 120-z may be determined to have an available storage offered to the cache service of 3 GB, and a determined available bandwidth of 50 Mbps.

Caching controller 115 analyzes the current available storage, and the current available bandwidth, for each of the participant nodes 120, and determines which of the devices has a sufficient available quantity of both storage and bandwidth. In one exemplary implementation, a pre-set threshold minimum value may be required for each of the available storage, and the available bandwidth. In other implementations, the threshold minimum for each of the available storage and the available bandwidth may vary based on the different devices registered for participation in the cache service and/or based on current network conditions. For example, if a high percentage of devices/nodes selected for participation in the cache service have a relatively high quantity of available storage offered to the cache service, then the threshold minimum value required of the available storage may be increased. Those participant nodes 120 determined to have a sufficient quantity of both available storage and available bandwidth may be admitted to a set of devices available for use in the cache service. Conversely, those participant nodes 120 determined to not have a sufficient quantity of either available storage or available bandwidth may be denied admission to the set of devices available for use in the cache service.

Returning to the example of FIG. 7, an analysis of the current available storage, and the current available bandwidth, of each of the participant nodes 120-1 through 120-*z* results in a determination that, since participant nodes 120-1, 120-2 and 120-*z* each have an available storage of at least 1 GB and an available bandwidth of at least 1 Mbps, that participant nodes 120-1, 120-2 and 120-*z* are admitted to the set of devices available for use in the cache service. Participant nodes 120-3 and 120-4, with both having less than 1 GB of available bandwidth and less than 1 Mbps bandwidth, are denied admission to the set of devices available for use in the cache service. This minimum threshold of 1 GB available storage, and 1 Mbps of available bandwidth represents only one example. In other embodiments, different minimum thresholds for available storage and/or available bandwidth may be selected at caching controller 115.

Caching controller 115 enables uploading of a distributed cache service application to admitted device(s) of the registered user device(s) (block 670). Caching controller 115 uploads, either directly subsequent to execution of block 660, or at some future time determined by the admitted participant node 120, a cache app 130 to the participant node 120. The cache app 130 may execute in the background of participant node 120 for, among other functions, managing the storage of, and retrieval of, content chunks in cache storage 205 at the participant node 120.

Figure 8A:
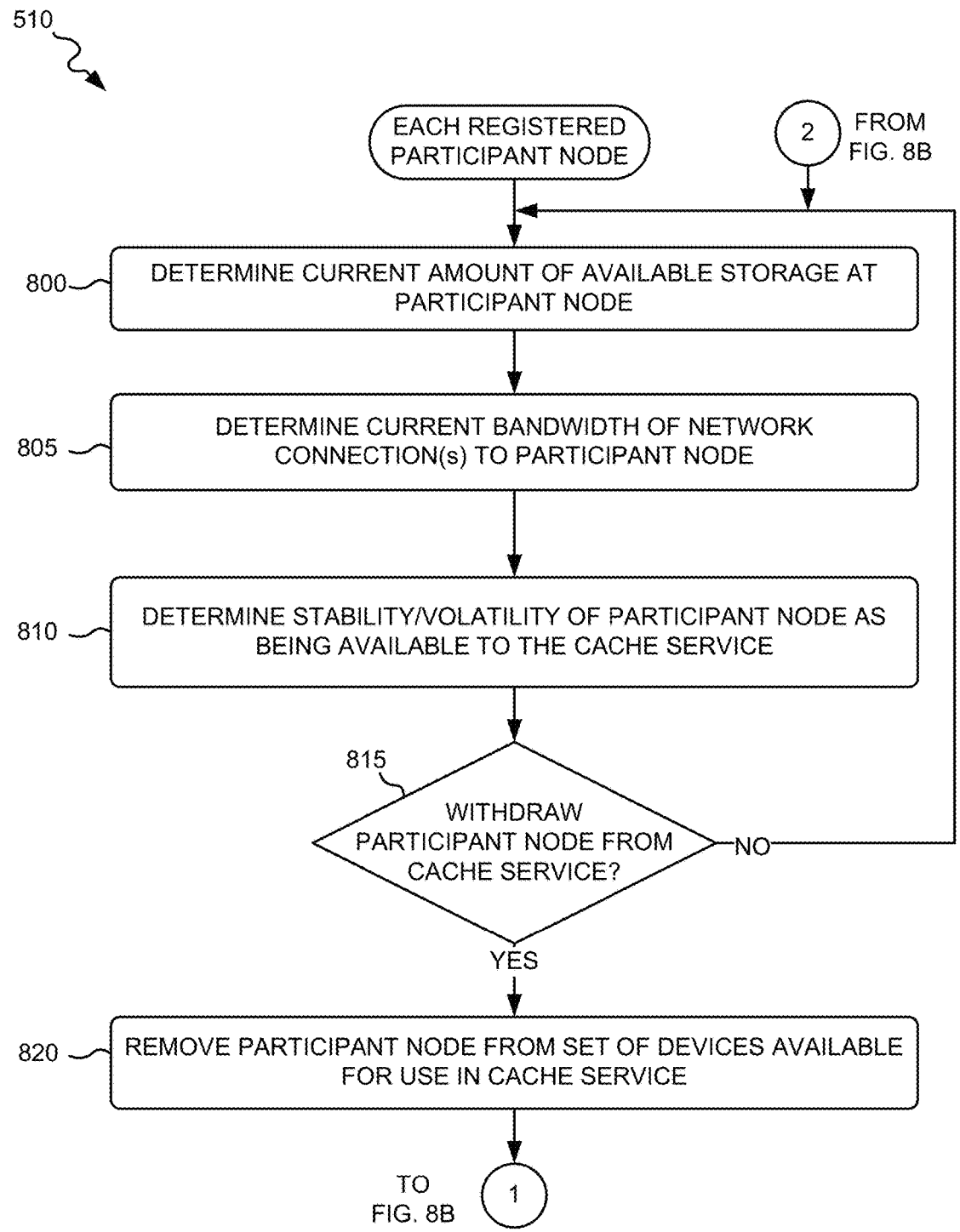
FIGS. 8A and 8B are flow diagrams that illustrate an exemplary process for performing "health checks" on each participant node admitted into the ad-hoc distributed cache service.
Figure 8B:
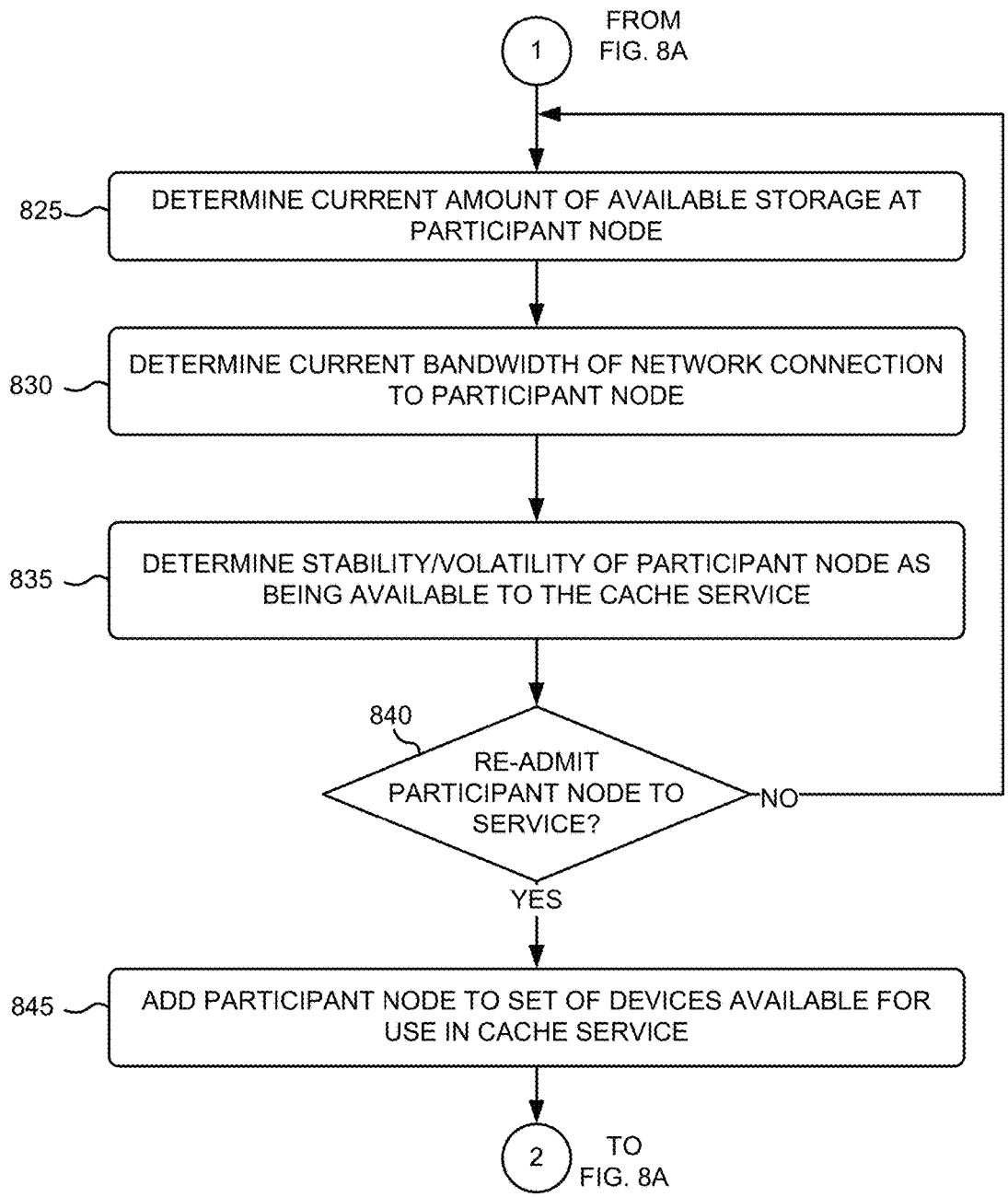

FIGS. 8A and 8B are flow diagrams that illustrate an exemplary process for performing "health checks" on each participant node 120 admitted into the ad-hoc distributed cache service. The exemplary process of FIGS. 8A and 8B may be implemented by caching controller 115, possibly in conjunction with other nodes. The exemplary process of 8A and 8B represents one exemplary implementation of block 510 of FIG. 5. The exemplary process of FIGS. 8A and 8B may be executed, continuously or periodically, for each device/node registered with the ad-hoc distributed cache service, and initially admitted in the set of devices/nodes available for use in the cache service, as described with respect to blocks 630, 640, 650, and 660 of FIGS. 6A and 6B above.

The exemplary process includes caching controller 115 determining a current amount of available storage at participant node 120 (block 800). For example, using the network address and/or unique device ID obtained in block 620 of FIG. 6A, caching controller 115 may query the registered participant node 120 to determine how much total free storage space is currently unused by the participant node(s). Caching controller 115 may additionally compare this determined total free storage space with the amount of storage, offered by the user in block 630 of FIG. 6A, to determine the amount of available storage space that is currently available for use at the participant node 120 by the cache service. As one example, if the total free storage space of a participant node 120 is determined by caching controller 115 to be 1 GB, and the user of the participant node 120 has offered 5 GB to the cache service, then caching controller 115 determines that 1 GB of the participant node 120 storage is currently available for use by the cache service. As another example, if the total free storage space of the participant node 120 is determined by caching controller 115 to be 5 GB, but the user of the participant node has only offered 1 GB to the cache service, then caching controller 115 determines that 1 GB of the participant node 120 is currently available for use by the cache service.

Caching controller 115 determines a current bandwidth of one or more network connections to the participant node 120 (block 805). Since network conditions may be transient (e.g., due to current network traffic loads), caching controller 115 may determine an updated, current bandwidth associated with one or more network connections to the participant node 120. For example, similar to block 640 of FIG. 6A, caching controller 115 may determine an overall upload speed (i.e., bandwidth) for sending data for storage at each registered participant node, and an overall download speed (i.e., bandwidth) for retrieving data from storage at the participant node 120. The determined overall upload and download speeds provide an indication to caching controller 115 of the available bandwidth(s) of one or more network connections traversing a path between caching controller 115 and the participant node 120.

Caching controller 115 determines a stability and/or volatility of the participant node 120 as being available to the ad-hoc distributed cache service (block 810). Caching controller 115 may make a determination in regards to any issue that affects the stability and/or volatility of the participant node 120 being available for use by the cache service. The determined stability and/or volatility of the participant node 120 being available to the cache service may be, for example, based on an amount of time that the participant node 120 is turned on, power instability issues associated with the node (e.g., frequent power outages), the user of the participant node 120 frequently dropping, and re-joining the cache service, or frequent and significant reductions in bandwidth available for connecting to the participant node 120. The determined stability of each participant node 120 being available to the cache service may further be, similar to the description above with respect to block 650, based on predictive modeling that predicts a future availability of a participant node 120 based on a prior history of availability of the participant node 120, such as when the prior history indicates a pattern of availability or non-availability of participant node 120. Based on this prior history, predictions may be made regarding the availability of these user devices to the cache service during various days of the week, during particular days of a month, and/or during particular hours of each day. For example, a "calendar of availability" may be constructed for each participant node, based on a prior history that indicates a pattern (e.g., daily/hourly) of availability or non-availability to the cache service.

In one embodiment, the determined stability and/or volatility of each participant node 120 being available to the cache service may be formalized as a retention "score" or "ranking" that can be used as a mechanism to determine whether to retain a participant node 120 as an active participant in the cache service, or whether to withdraw the participant node 120, at least temporarily, from participation in the cache service. Various algorithms may be used to generate the retention score or ranking based on, for example, the "calendar of availability" for each participant node 120 and/or based on other factors described above with respect to block 810.

Caching controller 115 determines whether to withdraw the participant node 120 from the cache service based on the determinations of blocks 800, 805 and/or 810 (block 815). Caching controller 115 may, for example, apply a threshold minimum to the amount of available storage determined in block 800, and/or a threshold minimum to the amount of current bandwidth available for connecting to the participant node 120 in block 805, to determine whether to remove the participant node 120 from the cache service. In one example, caching controller 115 may apply a minimum threshold of 500 MB as the minimum amount of storage of the participant node 120 available for use by the cache service, and a minimum threshold of 1 Mbps as the minimum available bandwidth for sending data to/from the participant node 120. Other minimum threshold may be applied by caching controller 115 in block 815.

Caching controller 115 may additionally, or alternatively, determine whether to remove the participant node 120 from the cache service based on whether the determined stability or volatility of the participant node 120 being available for use by the cache service is inadequate. Thus, if the participant node is not turned on a signification portion of the time, then caching controller 115 may determine that the participant node 120's availability to the cache service is not sufficiently stable enough, and may remove the participant node 120 from the cache service. Additionally, if the participant node 120 has frequent power outages (e.g., failing battery, or unstable electrical power system), or if there are frequent and significant reductions in available bandwidth for connecting to the participant node 120, then caching controller 115 may determine that the participant node 120's availability to cache service is too volatile, and may remove the participant node 120 from the cache service.

If caching controller 115 makes a determination to not withdraw the participant node 120 from the cache service (NO—block 815), then the exemplary process may return to block 800, with a repeat of the performance of "health checks" for the participant node 120. If caching controller 115 makes a determination to withdraw the participant node 120 from the cache service (YES—block 815), then caching controller 115 removes the participant node 120 from the set of devices/nodes available for use in the cache service (block 820). Content chunks currently stored at participant node 120 removed from the set of devices available for use in the cache service may be stored at an alternative participant node(s) 120.

Caching controller 115 determines a current amount of available storage at participant node 120 (block 825). Block 825 is performed similarly to block 800, described above in FIG. 8A. Caching controller 115 determines a current bandwidth of a network connection to the participant node 120 (block 830). Block 830 is performed similarly to block 805, described above in FIG. 8A. Caching controller 115 determines a stability and/or volatility of the participant node 120 as being available to the ad-hoc distributed cache service (block 835). Block 835 is performed similarly to block 810, described above in FIG. 8A.

Caching controller 115 determines whether to re-admit the participant node 120 to cache service based on the determinations in blocks 825, 830 and/or 835 (block 840). Caching controller 115 may, for example, apply a threshold minimum to the amount of available storage determined in block 825, and/or a threshold minimum to the amount of current bandwidth available for connecting to the participant node 120 in block 830, to determine whether to remove the participant node 120 from the cache service. In one example, caching controller 115 may apply a minimum threshold of 750 MB as the minimum amount of storage of the participant node 120 available for use by the cache service, and a minimum threshold of 500 Mbps as the minimum available bandwidth for sending data to/from the participant node 120. Other minimum thresholds may be applied by caching controller 115 in block 840. Caching controller 115 may additionally, or alternatively, determine whether to re-admit the participant node 120 to the cache service based on whether the determined stability or volatility of the participant node 120 being available for use by the cache service has again become adequate. Thus, if the participant node 120 is once again turned on a signification portion of the time (e.g., 23.5 hours out of a 24 hour day), then caching controller 115 may determine that the participant node 120's availability to the cache service is sufficiently stable enough, and may re-admit the participant node 120 to the cache service. Additionally, if the participant node 120 now has infrequent power outages, or if there are no frequent and significant reductions in available bandwidth for connecting to the participant node 120, then caching controller 115 may determine that the participant node 120's availability to cache service is not volatile, and may re-admit the participant node 120 to the cache service.

If caching controller 115 makes a determination to not re-admit the participant node 120 to the cache service (NO—block 840), then the exemplary process may return to block 825, with a repeat of the performance of "health checks" for the participant node 120. If caching controller 115 makes a determination to re-admit the participant node 120 to the cache service (YES—block 840), then caching controller 115 adds the participant node 120 to the set of devices available for use in the cache service (block 845). The exemplary process may then return to block 800 of FIG. 8A, with a continued performance of "health checks" for the participant node 120.

Figure 9:
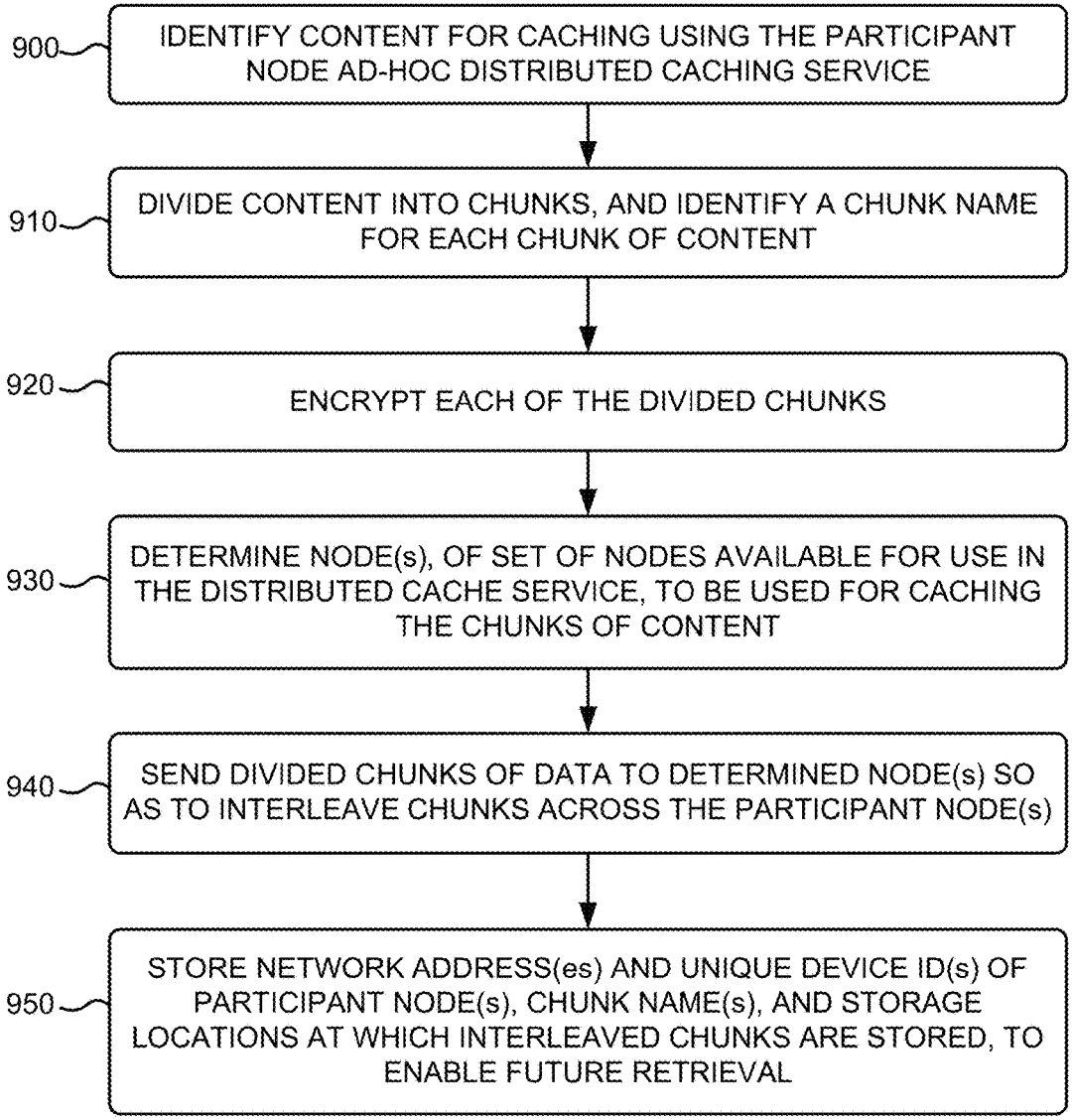
FIG. 9 is a flow diagram that illustrates an exemplary process for interleaving chunks of content across selected participant nodes admitted into the ad-hoc distributed cache service.

FIG. 9 is a flow diagram that illustrates an exemplary process for interleaving chunks of content across selected devices of participant nodes 120 admitted into the ad-hoc distributed cache service. The exemplary process of FIG. 9 may be implemented by caching controller 115, possibly in conjunction with other nodes. The exemplary process of FIG. 9 represents one exemplary implementation of block 520 of FIG. 5. The exemplary process of FIG. 9 may be executed for each item of content to be cached using the caching service described herein. The exemplary process of FIG. 9 is described below with reference to FIG. 10.

Figure 10:
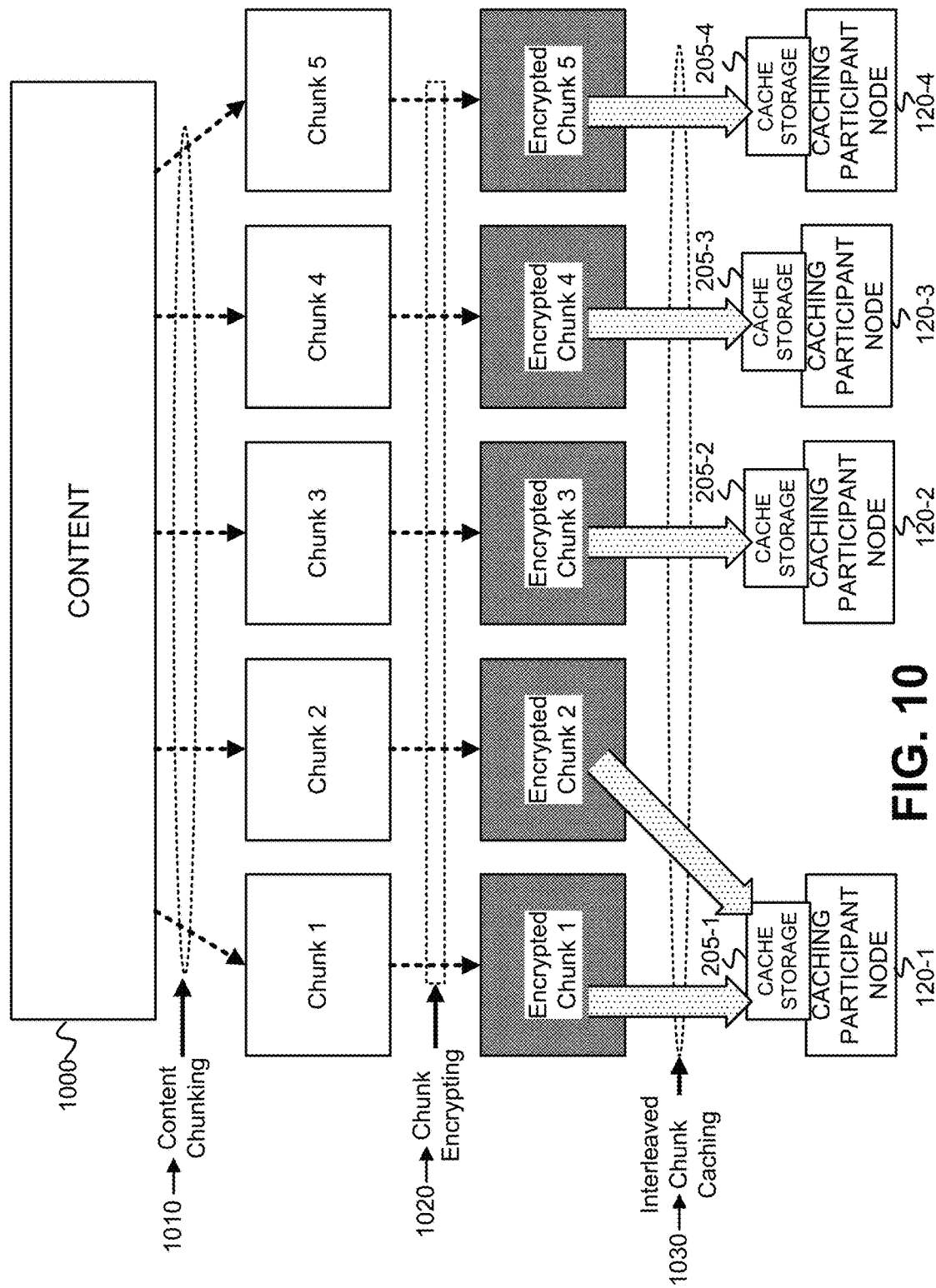
FIG. 10 depicts an example of the exemplary process of FIG. 9.

The exemplary process includes caching controller 115 identifying content for caching using the ad-hoc distributed caching service (block 900), and dividing the content into chunks and identifying a chunk name for each chunk of the content (block 910). Caching controller 115 may, in one implementation, divide the content into a number of chunks determined by a number of the participant nodes 120 currently having cache storage 205 available for use in the cache service. In another implementation, caching controller 115 may determine an amount of available storage at a certain number of participant nodes admitted into the cache service, and may divide the content into a number of chunks that fills the amount of available storage at the participant nodes. FIG. 10 depicts one example of a particular item of content (e.g., video) being divided into chunks. As shown in FIG. 10, content 1000 is divided into chunks using a content chunking process 1010. In the example shown, content 1000 is divided into chunks 1 through 5.

Caching controller 115 encrypts each of the divided chunks (block 920). Caching controller 115 may obtain, using existing techniques, an encryption key for the content. In one implementation, the encryption algorithm used by caching controller 115 may be a symmetric encryption algorithm, and the encryption key may serve as both an encryption key and a decryption key. In another implementation, the encryption algorithm used by caching controller 115 may be an asymmetric encryption algorithm (i.e., a public/private key encryption algorithm), and the encryption key may be the public key, and the decryption key may be the private key. Caching controller 115 may encrypt each of the divided chunks using the encryption algorithm and the encryption key. In the example shown in FIG. 10, a chunk encrypting process 1020 is performed to encrypt chunks 1 through 5 into encrypted chunks 1 through 5.

Caching controller 115 determines a participant node(s), of a set of nodes/devices available for use in the cache service, to be used for caching the chunks of content (block 930). Caching controller 115 may use one or more different techniques for determining which device(s)/node(s) to be used for caching the chunks of content. One technique may, for example, determine which participant nodes 120 in the set of devices/nodes to use for caching based on their network locations relative to one or more client devices 125 (e.g., a certain range of network hops from one or more client devices 125). An additional technique may determine which devices/nodes in the set of devices/nodes to use for caching based on load balancing principles. A further technique may determine which devices/nodes in the set of devices/nodes to use for caching based on traffic loads (e.g., traffic hotspots) in the vicinities of the participant nodes 120. The one or more different techniques may be used alone, or in combination with one another. If the total set of devices/nodes available for use in the cache service includes {D1, D2, . . . , Dt}, caching controller 115 may determine a set of devices/nodes {D1, D2, . . . , Dc} to be used for caching the chunks, where c is less than, or equal to, t. In the example of FIG. 10, caching controller 115 determines that encrypted chunk 1 and encrypted chunk 2 is to be stored at cache storage 205-1 of participant node 120-1, encrypted chunk 3 is to be stored at cache storage 205-2 of participant node 120-2, encrypted chunk 4 is to be stored at cache storage 205-3 of participant node 120-3, and encrypted chunk 5 is to be stored at cache storage 205-4 of participant node 120-4.

When determining which node(s) of participant nodes 120 in the set of devices/nodes are to be used for caching the content, caching controller 115 may also identify one or more "backup" participant nodes 120 at which content may be cached in the event that any particular participant node 120, initially chosen for content caching, becomes unavailable (e.g., due to lost network connection, device power outage, device turned off, etc.). Identification of the one or more "backup" participant nodes 120 may be based on various factors, including network proximity to certain client devices 125, available storage at each candidate "backup" participant node, and/or available bandwidth at each candidate "backup" participant node.

Caching controller 115 sends the divided chunks of data to the determined participant node(s) so as to interleave the chunks across the node(s) (block 940). In the example of FIG. 10, caching controller 115 engages in an interleaved chunk caching process 1030 to send encrypted chunk 1 and encrypted chunk 2 to cache storage 205-1 of participant node 120-1, encrypted chunk 3 to cache storage 205-2 of participant node 120-2, encrypted chunk 4 to cache storage 205-3 of participant node 120-3, and encrypted chunk 5 to cache storage 205-4 of participant node 120-4.

Caching controller 115 stores the network addresses and unique device IDs of the participant nodes 120, the chunk name(s), and the storage locations at which the interleaved chunks are stored, to enable future retrieval (block 950). For example, caching controller 115 may store the network addresses and unique device IDs of the participant nodes 120, the chunk name(s), and the storage locations at which the interleaved chunks are stored, in main memory 330 of caching controller 115. Alternatively, caching controller 115 may store this data in, for example, an external database not depicted in the network environment 100 of FIG. 1. Caching controller 115 may additionally, or as an alternative to the network address, obtain and store the network location at which the registered participant node 120 attaches to network 110. For example, if the registered participant node 120 attaches to a local area network (LAN), which in turn connects to network 110 via a server, router, or gateway, then caching controller 115 may obtain the network location (e.g., the network address) of the network attachment at the server, router, or gateway.

Figure 11:
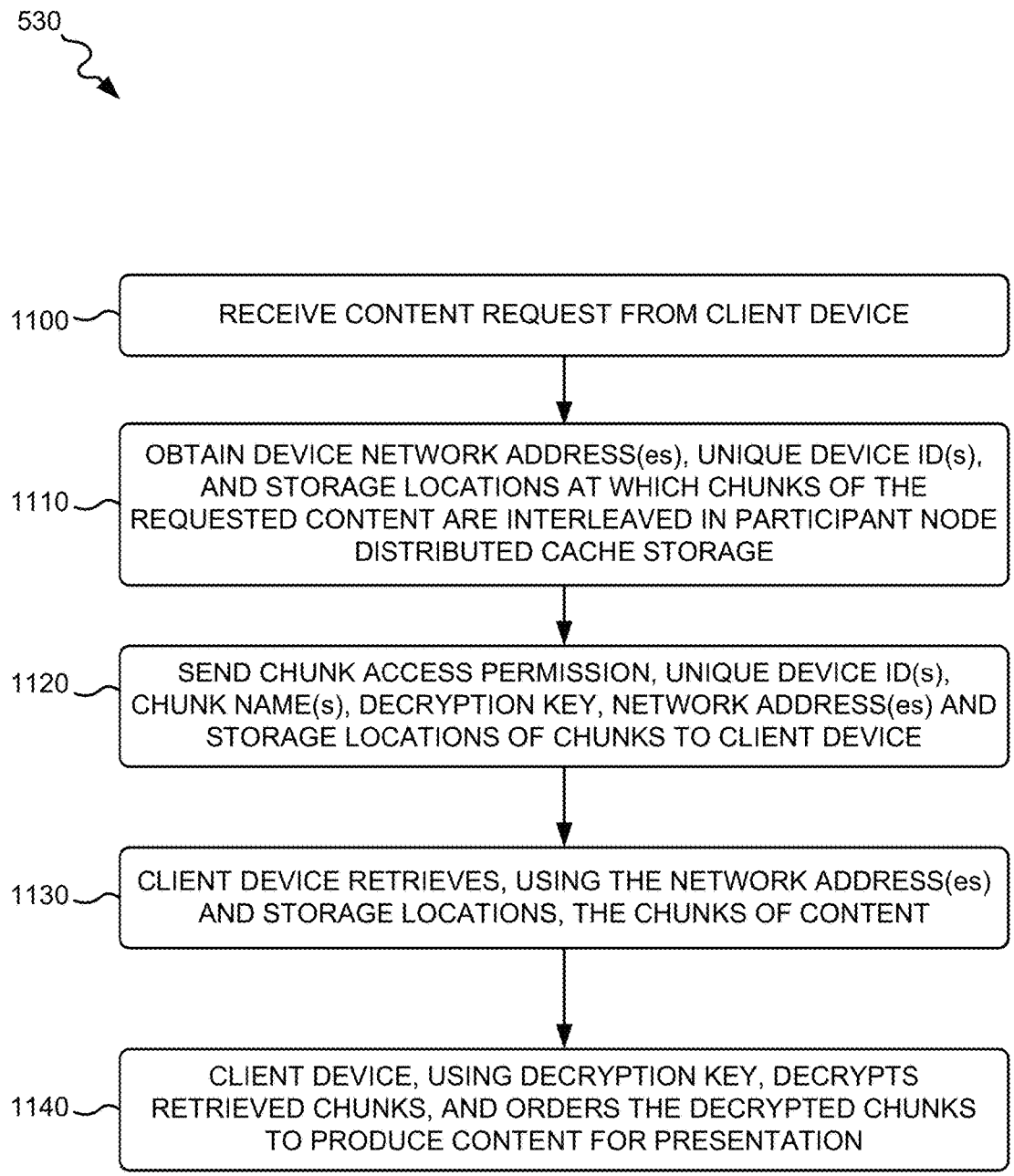
FIG. 11 is a flow diagram that illustrates an exemplary process for client device access to, and retrieval of, chunks of content from cache storage at one or more participant nodes.

FIG. 11 is a flow diagram that illustrates an exemplary process for client device 125 access to, and retrieval of, chunks of content from cache storage 205 at one or more participant nodes 120. The exemplary process of FIG. 11 represents one exemplary implementation of block 530 of FIG. 5. The exemplary process of FIG. 11 may be implemented by caching controller 115, in conjunction with client device 125. The exemplary process of FIG. 11 may be executed for each item of content to be requested for retrieval from cache storage 205 at participant nodes 120. The exemplary process of FIG. 11 is described below with reference to FIG. 2B and FIG. 12.

The exemplary process includes caching controller 115 receiving a content request from client device 125 (block 1100). The content request may identify the particular item of content (e.g., particular item of video) that the user at client device 125 wishes to access. Referring again to FIG. 2B, client device 125 is shown as sending a content request 220 to caching controller 115 for obtaining permission to access content chunks stored in cache storage.

Caching controller 115 obtains a device network address(es), a unique device ID(s), and storage locations at which the chunks of the requested content are interleaved in participant node ad-hoc distributed cache storage 200 (block 1110). Caching controller 115 may have previously, in block 950 of FIG. 9, stored this information subsequent to interleaving the chunks of the content across cache storage at multiple different participant nodes 120. The device network address(es), unique device ID(s), and storage locations may include a network address and unique device ID for each participant node 120 at which a chunk(s) is stored. Each storage location includes an identification of a location in memory (i.e., of cache storage 205) at which each chunk is stored. Caching controller 115 may have additionally, or as an alternative to the network address, stored a network location at which the participant node 120 attaches to network 110. For example, if the participant node 120 attaches to a local area network (LAN), which in turn connects to network 110 via a server, router, or gateway, then caching controller 115 may obtain the network location (e.g., the network address) of the network attachment at the server, router, or gateway.

Caching controller 115 sends a chunk access permission, the unique device ID(s), the chunk name(s), a decryption key, the network address(es), and the storage locations of the chunks to client device 125 (block 1120). Caching controller 115 may authenticate, or otherwise identify the legitimacy of the content request from, client device 125, and may grant or deny access permission to client device 125 based on results of the authentication.

Referring again to FIG. 2B, caching controller 115 returns a chunk access permission 225 to client device 125, where the chunk access permission 225 may further include the unique device ID(s), the chunk name(s), a decryption key, the network addresses, and the storage locations of the chunks at the respective participant nodes 120. The unique device ID(s) uniquely identifies each participant node 120 at which chunks of the requested content has been stored in cache storage 205. The decryption key includes the key that client device 125 may use to decrypt the chunks of content retrieved from cache storage 205 at participant nodes 120. The network addresses include the network address of each of the participant nodes 120 at which chunks of content are stored in cache storage 205. The storage locations identify locations in memory, in cache storage 205, at each of the participant nodes 120 at which each chunk of the requested content is stored. Caching controller 115 may additionally, or as an alternative to the network address, send the network location at which the registered participant node 120 attaches to network 110.

Figure 12:
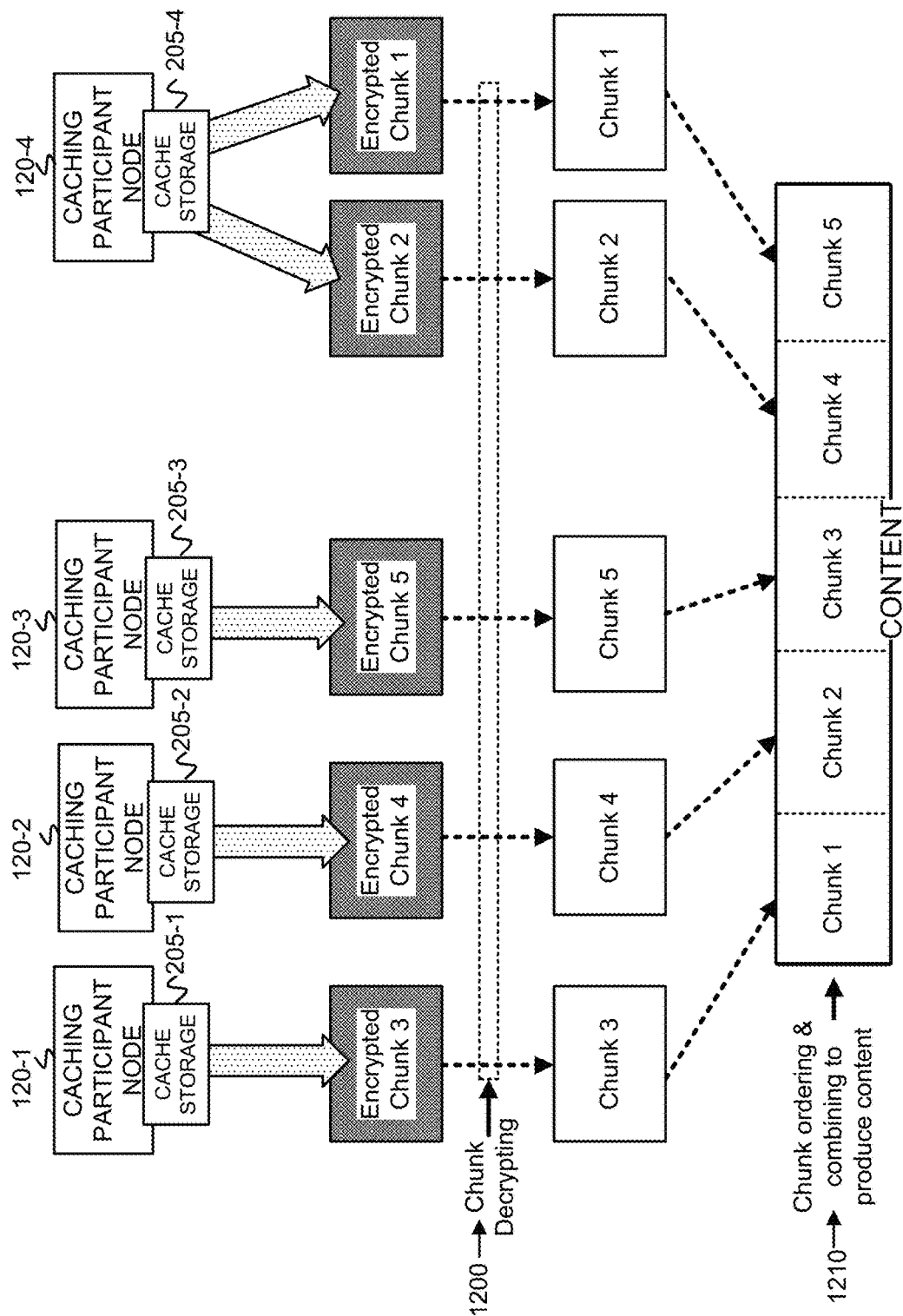
FIG. 12 depicts an example of the exemplary process of FIG. 11.

Client device 125 retrieves, using the network address(es) and storage locations, the chunks of content (block 1130). Client device 125 sends a chunk retrieval request to each participant node 120 identified by a unique device ID and located at a network address contained in the chunk access permission 225. A cache app 130, at each participant node 120 that receives a chunk retrieval request, may validate the client device 125 identified in the chunk retrieval request prior to retrieving and returning the request chunk(s) of content to the client device 125. In the example of FIG. 12, encrypted chunks are depicted as being returned from cache storage 205 at participant nodes 120-1 through 120-4.

Client device 125, using the decryption key, decrypts the retrieved chunks, and orders the decrypted chunks to produce the content for presentation (block 1140). The example of FIG. 12 depicts a chunk decrypting process 1200 being performed upon encrypted chunks 1-5 to produce original chunks 1-5. FIG. 12 further depicts a chunk ordering and combining process 1210 applied to the original chunks 1-5 to take the out-of-order chunks, place them in their proper sequential order, and to combine the ordered chunks to produce the content in its original un-cached form. A client application, at client device 125, may then "consume" the content, such as, for example, presenting the content to a user of client 125. If the content comprises a video file, the client application, as a media player, may play back the video file via a display unit of client device 125. If the content comprises an audio-only file, the client application, as a media player, may play back the audio file via a speaker of client device 125.

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with respect to FIGS. 5, 6A, 6B, 8A, 8B, 9, and 11, the order of the blocks may be varied in other implementations. Moreover, non-dependent blocks may be performed in parallel. Some embodiments have been described herein with respect to media that includes HLS media. However, the embodiments described herein may also be applied to Smooth Streaming or Adaptive Bit Rate Streaming media. Certain embodiments have been described herein as involving content caching with respect to content in a CDN. However, the systems and processes described herein may be applied to any application in which any type of content, or other forms of data, is delivered across network 110 from a content source to content receiving endpoints, and where content chunks are cached in association with such content delivery. Embodiments have been described herein as using divisions of physical memory for caching content chunks. Virtual or logical divisions of memory may also, or alternatively, be used for caching content chunks.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving a user election of participation in a distributed cache service;
   receiving a user selection of one or more devices, that are each associated with the user, to register with the distributed cache service as participant nodes, wherein the participant nodes include cache applications that facilitate caching chunks of content for one or more user devices;
   determining an amount of available storage offered to the distributed cache service for reach of the one or more devices;
   determining an available bandwidth of a respective network connection associated with each of the one or more devices;
   admitting selected devices of the one or more devices as participant noes into the distributed cache based on the available storage and the available bandwidth for each of the selected devices;
   interleaving storage of multiple chunks of content across a subset of the participant nodes admitted into the distributed cache service; and enabling client access to the multiple chunks of content interleaved across the subset of the participant nodes.

2. The method of claim 1, further comprising:
identifying the content for caching;
dividing the content into the multiple chunks of content; and
encrypting each of the multiple chunks of content.

3. The method of claim 1, further comprising:
determining a calendar of availability, for each of the one or more participant nodes, that indicates a pattern of availability or non-availability to the distributed cache service,
wherein admitting the selected devices of the one or more participant nodes into the distributed cache service is further based on the calendar of availability for each of the one or more participant nodes.

4. The method of claim 1, further comprising:
determining the subset of the participant nodes, for caching the multiple chunks of content, based on a network location of the participant nodes, based on load balancing principles, or based on network traffic loads in the vicinities of the participant nodes.

5. The method of claim 1, wherein enabling the client access to the multiple chunks of content interleaved across the subset of the participant nodes comprises:
receiving a request for the content from a client;
obtaining device network addresses, unique device identifiers, and storage locations at which the multiple chunks of the content are interleaved; and
sending a chunk access permission, the device network addresses, the unique device identifiers, and the storage locations, to the client for retrieval of the content.

6. The method of claim 1, further comprising:
determining, after admitting the selected devices of the one or more devices as participant nodes into the distributed cache service, a current amount of available storage of each of the selected devices;
determining, after admitting the selected devices of the one or more devices as participant nodes into the distributed cache service, a current bandwidth of a respective connection to each of the selected devices; and
removing ones of the selected devices from availability for use in the distributed cache service based on the determined current amount of available storage and based on the determined current bandwidth.

7. The method of claim 1, further comprising:
determining, after admitting the selected devices of the one or more devices as participant nodes into the distributed cache service, a calendar of availability, for each of the selected devices that indicates a pattern of availability or non-availability to the distributed cache service; and
removing ones of the selected devices from availability for use in the distributed cache service based on the determined calendar of availability for each of the selected devices.

8. A system, comprising:
at least one communication interface configured to connect to a network and to:
receive a user election of participation in a distributed cache service, and
receive a user selection of one or more devices, that are each associated with the user, to register with the distributed cache service as participant nodes, wherein the participant nodes include cache applications that facilitate caching chunks of content for one or more user devices; and
at least one processing unit configured to:
determine an amount of available storage offered to the distributed cache service for reach of the one or more devices;
determine an available bandwidth of a respective network connection associated with each of the one or more devices;
admit selected devices of the one or more devices as participant noes into the distributed cache based on the available storage and the available bandwidth for each of the selected devices;
interleave storage of multiple chunks of content across a subset of the participant nodes admitted into the distributed cache service; and
enable client access to the multiple chunks of content interleaved across the subset of the participant nodes.

9. The system of claim 8, wherein the at least one processing unit is further configured to:
identify the content for caching, and
divide the content into the multiple chunks of content.

10. The system of claim 8, wherein the at least one processing unit is further configured to:
determine the subset of the participant nodes, for caching the multiple chunks of content, based on a network location of the participant nodes, based on load balancing principles, or based on network traffic loads in the vicinities of the participant nodes.

11. The system of claim 8, wherein the at least one communication interface is further configured to receive a request for the content from a client, and wherein, when enabling the client access to the multiple chunks of content interleaved across the subset of the participant nodes, the at least one processing unit is further configured to:
obtain device network addresses, unique device identifiers, and storage locations at which the multiple chunks of the content are interleaved, and
send a chunk access permission, the device network addresses, the unique device identifiers, and the storage locations, to the client for retrieval of the content.

12. The system of claim 8, wherein the at least one processing unit is further configured to:
determine, after admitting the selected devices of the one or more devices as participant nodes into the distributed cache service, a current amount of available storage of each of the selected devices, and
remove ones of the selected devices from availability for use in the distributed cache service based on the determined current amount of available storage.

13. The system of claim 8, wherein the at least one processing unit is further configured to:
determine, after admitting the selected devices of the one or more devices as participant nodes into the distributed cache service, a current bandwidth of a respective connection to each of the selected devices, and
remove ones of the selected devices from availability for use in the distributed cache service based on the determined current bandwidth.

14. A non-transitory storage medium storing instructions executable by a device, wherein the instructions comprise instructions to:
receive a user election of participation in a distributed cache service;
receive a user selection of one or more devices, that are each associated with the user, to register with the distributed cache service as participant nodes, wherein the participant nodes include cache applications that facilitate caching chunks of content;

determine an amount of available storage offered to the distributed cache service for each of the one or more devices;

determine an available bandwidth of a respective network connection associated with each of the one or more devices;

admit selected devices of the one or more devices as participant nodes into the distributed cache service based on the available storage and the available bandwidth for each of the selected devices;

interleave storage of multiple chunks of content across a subset of the participant nodes admitted into the distributed cache service; and enable client access to the multiple chunks of content interleaved across the subset of the participant nodes.

15. The non-transitory storage medium of claim 14, wherein the instructions further comprise instructions to:

identify the content for caching; and divide the content into the multiple chunks of content.

16. The non-transitory storage medium of claim 15, wherein the instructions further comprise instructions to:

encrypt each of the multiple chunks of content.

17. The non-transitory storage medium of claim 14, wherein the instructions further comprise instructions to:

determine the subset of the participant nodes, for caching the multiple chunks of content, based on a network location of the participant nodes, based on load balancing principles, or based on network traffic loads in the vicinities of the participant nodes.

18. The non-transitory storage medium of claim 14, wherein the instructions to enable the client access to the multiple chunks of content interleaved across the subset of the participant nodes further comprise instructions to:

receive a request for the content from a client;

obtain device network addresses, unique device identifiers, and storage locations at which the multiple chunks of the content are interleaved; and send a chunk access permission, the device network addresses, the unique device identifiers, and the storage locations, to the client for retrieval of the content.

19. The non-transitory storage medium of claim 14, wherein the instructions further comprise instructions to:

determine, after admitting the selected devices of the one or more devices as participant nodes into the distributed cache service, current amount of available storage of each of the selected devices; and remove ones of the selected devices from availability for use in the distributed cache service based on the determined current amount of available storage.

20. The non-transitory storage medium of claim 14, wherein the instructions further comprise instructions to:

determine, after admitting the selected devices of the one or more devices as participant nodes into the distributed cache service, a current bandwidth of a respective connection to each of the selected devices; and remove ones of the selected devices from availability for use in the distributed cache service based on the determined current bandwidth.

* * * * *